United States Patent [19]

Elser et al.

[11] 4,198,205

[45] Apr. 15, 1980

[54] TRIAZINYL-ANTHRAQUINONE DYE FORMULATIONS FOR CELLULOSE OR CELLULOSIC FIBROUS MATERIAL

[75] Inventors: Wolfgang Elser, Wachenheim; Heinz Eilingsfeld, Frankenthal; Guenter Meyer, Ludwigshafen, all of Fed. Rep. of Germany

[73] Assignee: BASF Aktiengesellschaft, Fed. Rep. of Germany

[21] Appl. No.: 906,684

[22] Filed: May 15, 1978

Related U.S. Application Data

[62] Division of Ser. No. 758,668, Jan. 12, 1977, abandoned.

[30] Foreign Application Priority Data

Jan. 21, 1976 [AT] Austria ................................ 381/76

[51] Int. Cl.[2] ...................... C09B 1/00; C07D 251/48

[52] U.S. Cl. ...................................... 8/39 R; 8/54.2; 8/93; 544/187; 544/188; 544/189

[58] Field of Search ......................... 8/39 R, 54.2, 93

[56] References Cited

U.S. PATENT DOCUMENTS

| | | | |
|---|---|---|---|
| 1,888,631 | 11/1932 | Kunz | 8/54.2 |
| 3,297,695 | 1/1967 | Weidinger et al. | 8/39 R |
| 3,349,089 | 10/1967 | Kazanicov et al. | 8/179 |
| 3,384,638 | 5/1968 | Mix et al. | 8/54.2 |
| 3,706,525 | 12/1972 | Blackwell et al. | 8/21 C |
| 4,049,377 | 9/1977 | Schwab et al. | 8/21 C |

*Primary Examiner*—A. Lionel Clingman
*Attorney, Agent, or Firm*—Keil & Witherspoon

[57] ABSTRACT

Dye formulations for dyeing or printing cellulose or cellulosic fibrous material which in addition to the usual dispersing agents, water retention agents, disinfectants and water contain dyes devoid of sulfonic acid groups and of the general formula:

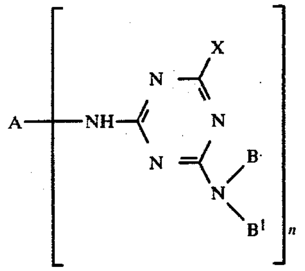

in which A is an anthraquinonyl, anthrapyrimidone or anthrapyrimidine radical which may bear substituents; X is hydrogen or an aliphatic, cycloaliphatic, araliphatic or aromatic radical; B is hydrogen or an aliphatic radical; $B^1$ is an aliphatic, araliphatic or aromatic radical or the group

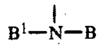

is a five-membered, six-membered or seven-membered heterocyclic ring; and n is 1 or 2. Dyeings and prints having very good fastness properties and particularly very good fastness to wet treatments and crocking are obtained on cellulose. The dyes contained in the formulations are fixed on swollen cellulosic fibers by heating.

7 Claims, No Drawings

TRIAZINYL-ANTHRAQUINONE DYE FORMULATIONS FOR CELLULOSE OR CELLULOSIC FIBROUS MATERIAL

This is a division of application Ser. No. 758,668 filed Jan. 12, 1977, abandoned.

The invention relates to aqueous dye formulations for dyeing cellulose or cellulosic fibrous material which in addition to one or more conventional dispersing agents, water retention agents, disinfectants and water contain one or more dyes devoid of sulfonic acid groups and of the general formula (I):

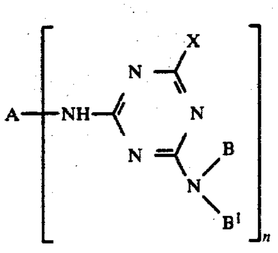

(I)

in which

A is an unsubstituted or substituted anthraquinonyl, anthrapyridone or anthrapyrimidine, X is hydrogen or an aliphatic, cycloaliphatic, araliphatic or aromatic radical;

B is hydrogen or an aliphatic radical;

$B^1$ is an aliphatic, cycloaliphatic, araliphatic or aromatic radical; or the group

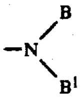

is a saturated five-membered, six-membered or seven-membered heterocyclic radical; and n is 1 or 2.

Radicals for A include monovalent and divalent α-anthraquinonyl radicals which may bear substituents in other α-positions or in the β-position, α-anthrapyridone radicals and α-anthrapyrimidine radicals which may bear substituents.

Examples of substituents which may be present in the monovalent or divalent α-anthraquinonyl radicals are as follows:

(a) for α-positions:

hydroxy, $C_1$ to $C_4$ alkoxy, amino, $C_1$ to $C_8$ alkylamino; $C_1$ to $C_8$ alkylamino bearing hydroxy, $C_1$ to $C_4$ alkoxy, cyano or carbonylalkoxy of one to five carbon atoms as substituents; phenylamino; phenylamino bearing $C_1$ to $C_5$ alkyl, methoxy, ethoxy, phenoxy, chloro or bromo as substituents; $C_1$ to $C_6$ alkylthio; phenylthio; phenylthio bearing $C_1$ to $C_5$ alkyl as a substituent;

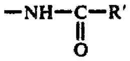

in which R' is $C_1$ to $C_5$ alkyl; phenyl; phenyl bearing $C_1$ to $C_4$ alkyl, bromo, chloro, methoxy or ethoxy as a substituent; the substituents being identical or different in cases where there is more than one substituent;

(b) for β-positions:

chloro, bromo, methyl, ethyl, $C_1$ to $C_6$ alkoxy, phenoxy, alkylphenoxy of one to six carbon atoms in the alkyl, chlorophenoxy, bromophenoxy, $C_1$ to $C_6$ alkylthio, phenylthio, alkylphenylthio of one to six carbon atoms in the alkyl, acetyl, propionyl, benzoyl, monomethylbenzoyl, dimethylbenzoyl, trimethylbenzoyl, phenoxybenzoyl, $C_1$ to $C_6$ alkoxycarbonyl, N-alkyl or N,N-dialkylaminocarbonyl of one to six carbon atoms in each alkyl, phenylaminocarbonyl, alkylphenylaminocarbonyl of one to six atoms in the alkyl, cyano, $C_1$ to $C_6$ alkylsulfonyl, phenylsulfonyl, $C_1$ to $C_6$ alkylphenylsulfonyl, N-alkylsulfamoyl or N,N-dialkylsulfamoyl of one to six carbon atoms in each alkyl, N-alkoxyalkylsulfamoyl or N,N-bisalkoxyalkylsulfamoyl of three to twelve carbon atoms in each alkoxyalkyl.

In one of the β-positions or α-positions there may also be present a nitro group or in one β-position an oxadiazole or thiodiazole radical. The sum of the substituents in the α- and β-positions is from zero to 6.

The anthrapyridone radicals or anthrapyrimidine radicals may also if desired bear $C_1$ to $C_5$ alkyl, hydroxy, amino, phenyl,

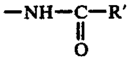

$C_1$ to $C_5$ alkylphenyl, $C_1$ to $C_6$ alkoxycarbonyl, $C_1$ to $C_4$ alkylcarbonyl, benzoyl or cyano as a substituent. The number of substituents may be zero, 1 or 2 and particularly zero or 1.

Besides hydrogen, X may be for example the following substituents: linear or branched $C_1$ to $C_8$ alkyl; $C_1$ to $C_8$ alkyl bearing chloro, bromo, $C_1$ to $C_4$ alkoxy, carboxyalkoxy of a total of two to five carbon atoms, $C_1$ to $C_4$ alkylsulfonyl and/or phenoxy as a substituent; cyclohexyl; araliphatic radicals such as phenalkyl of seven to ten carbon atoms; phenyl; naphthyl; phenyl or naphthyl bearing $C_1$ to $C_{18}$ alkyl, $C_1$ to $C_4$ alkoxy, $C_2$ to $C_4$ hydroxyalkoxy, $C_1$ to $C_4$ alkylthio, chloro, bromo, trifluoromethyl nitro, cyano, sulfamoyl, N-alkylsulfamoyl, N,N-dialkylsulfamoyl of one to eight carbon atoms per alkyl, carbamoyl, N-alkylaminocarbonyl, N,N-dialkylaminocarbonyl of one to eight carbon atoms per alkyl, carbonylalkoxy of a total of two to five carbon atoms, $C_1$ to $C_4$ alkylsulfonyl or $C_1$ to $C_4$ alkylcarbonyl as substituents, the number of substituents on the phenyl or naphthyl being from one to three and preferably one or two and the substituents being identical or different.

Specific examples of radicals X other than those already specified are:

(1) substituted or unsubstituted alkyl: methyl, ethyl, propyl, isopropyl, butyl, isobutyl, sec-butyl, hexyl, octyl, 2-ethylhexyl, 2-methoxyethyl, 2-ethoxyethyl, 2-butoxyethyl, 3-methoxypropyl, 3-ethoxypropyl, 3-propoxypropyl, 3-butoxypropyl, phenoxymethyl, dichlorophenoxymethyl and p-methylphenoxymethyl;

(2) phenalkyl of seven to ten carbon atoms, benzyl, phenylethyl, phenylpropyl and phenylbutyl;

(3) substituted or unsubstituted phenyl and naphthyl: phenyl, methylphenyl, dimethylphenyl, trimethylphenyl, ethylphenyl, diethylphenyl, triethylphenyl, propylphenyl, isopropylphenyl, butylphenyl, isobutylphenyl, sec.-butylphenyl, tert.-butylphenyl, octylphenyl, isooctylphenyl, (α'-ethylhexyl)-phenyl, decylphenyl, dodecylphenyl, octadecylphenyl, methoxyphenyl, dimethoxyphenyl, ethoxyphenyl, diethoxyphenyl, propoxyphenyl, diisopropoxyphenyl, butoxyphenyl, chlorophenyl, dichlorophenyl, bromophenyl, dibromophenyl, methoxycarbonylphenyl, ethoxycarbonylphenyl, butoxycarbonylphenyl, N-methylsulfamoylphenyl, N,N-dimethylsulfamoylphenyl, N-ethylsulfamoylphenyl, N-butylsulfamoylphenyl, N,N-dibutylsulfamoylphenyl, N-hexylsulfamoylphenyl, N,N-dihexylsulfamoylphenyl, N-octylsulfamoylphenyl, N,N-dioctylsulfamoylphenyl, N-methylaminocarbonylphenyl, N,N-dimethylaminocarbonylphenyl, N-ethylaminocarbonylphenyl, N,N-diethylaminocarbonylphenyl, N-butylaminocarbonylphenyl, N,N-dibutylaminocarbonylphenyl, N-hexylaminocarbonylphenyl, N-octylaminocarbonylphenyl, cyanophenyl and nitrophenyl.

Preferred radicals for X are: methyl, ethyl, p-chlorophenyl, p-bromophenyl, p-$C_1$ to $C_4$ alkylphenyl such as p-methylphenyl, p-ethylphenyl, p-isopropylphenyl, p-butylphenyl, p-tert.-butylphenyl, p-methoxyphenyl, p-ethoxyphenyl and m-N,N-bis $C_1$ to $C_4$ alkylsulfamoylphenyl such as N,N-dimethylsulfamoylphenyl and N,N-diethylsulfamoylphenyl. Unsubstituted phenyl is particularly preferred for X.

Radicals for B, in addition to hydrogen, include: linear or branched $C_1$ to $C_4$ alkyl; $C_1$ to $C_4$ alkyl bearing hydroxy, cyano, chloro, bromo, carbonylalkoxy of a total of two to five carbon atoms, N-alkylaminocarbonyl or N,N-dialkylaminocarbonyl of one to eight carbon atoms per alkyl, $C_1$ to $C_4$ alkylsulfonyl or phenoxy as substituents or alkoxyalkyl of a total of three to six carbon atoms.

Specific examples of radicals for B are: hydrogen, methyl, ethyl, propyl, isopropyl, n-butyl, isobutyl, sec.-butyl, tert.-butyl, 2-hydroxyethyl, 2-chloroethyl, 2-bromoethyl, 2-(methylthio)-ethyl, 2-cyanoethyl, 2-(methoxycarbonyl)-ethyl, 2-(ethoxycarbonyl)-ethyl, 2-(butoxycarbonyl)-ethyl, 2-(methylsulfonyl)-ethyl and 2-(butylsulfonyl)-ethyl. B is preferably $C_1$ to $C_4$ alkyl. Hydrogen is particularly preferred for B.

Examples of $B^1$ as aliphatic, cycloaliphatic, araliphatic or aromatic radicals are:

(a) unsaturated or preferably saturated linear or branched $C_1$ to $C_{18}$ alkyl;

(b) $C_2$ to $C_8$ alkyl optionally bearing hydroxyl, cyano, chloro, bromo, carbonylalkoxy of a total of two to five carbon atoms, N-alkylaminocarbonyl or N,N-dialkylaminocarbonyl of one to eight carbon atoms per alkyl, $C_1$ to $C_4$ alkylsulfonyl, dialkylamino of one to four carbon atoms per alkyl or phenoxy, the number of substituents being two or preferably one;

(c) alkoxyalkyl of a total of three to eleven carbon atoms;

(d) hydroxyalkoxyalkyl of a total of four to ten carbon atoms;

(e) phenoxyalkoxyalkyl of a total of ten to twelve carbon atoms;

(f) saturated five-membered, six-membered, seven-membered or eight-membered cycloalkyl or polycycloalkyl;

(g) cycloalkyl optionally bearing one to three $C_1$ to $C_8$ alkyl, cycloalkyl and/or hydroxyl as substituents;

(h) phenalkyl of a total of seven to ten carbon atoms in which the alkyl radical may be substituted by hydroxy and the phenyl radical may be substituted by $C_1$ to $C_{15}$ alkyl;

(i) phenyl or naphthyl in which one to three, preferably one or two and particularly one hydrogen atom may be replaced by $C_1$ to $C_{18}$ alkyl, chloro, bromo, trifluoromethyl, nitro, cyano, $C_1$ to $C_5$ alkoxy, $C_1$ to $C_4$ alkylthio, sulfamoyl, N-alkylsulfamoyl or N,N-dialkylsulfamoyl of one to eight carbon atoms per alkyl, N-phenylsulfamoyl, carbamoyl, N-alkylaminocarbonyl or N,N-dialkylaminocarbonyl of one to eight carbon atoms per alkyl, carbonylalkoxy of a total of two to six carbon atoms, $C_1$ to $C_4$ alkylsulfonyl, phenylsulfonyl optionally bearing alkyl as a substituent in the phenyl, $C_1$ to $C_4$ alkylcarbonyl, phenalkoxy of seven to ten carbon atoms in which the phenyl radical may bear chloro, bromo or cyano as a substituent, phenoxy or 4-chlorophenoxy and wherein the substituents may be identical or different and where when there is more than one alkyl or alkoxy, or alkyl and alkoxy, the sum of the carbon atoms in these substituents is not more than twelve.

Specific radicals $B^1$ other than those already specified include for example:

(1) unsubstituted or substituted alkyl: the alkyls specified for B and also n-pentyl, isoamyl, sec.-pentyl, neopentyl, n-hexyl, methylpentyl, dimethylbutyl, n-heptyl, methylhexyl, dimethylpentyl, trimethylbutyl, n-octyl, isooctyl, methylheptyl, 2-ethylhexyl, dimethylhexyl, trimethylpentyl, tetramethylbutyl, n-nonyl, isononyl, dimethylheptyl, trimethylhexyl, decyl, undecyl, dodecyl, 2,2-dimethyldecyl, tetradecyl, hexadecyl, octadecyl, 2-hydroxyethyl, 3-hydroxypropyl, 2-chloroethyl, 2-bromoethyl, 2-methylthioethyl, 2-butylthioethyl, 2-cyanoethyl, 2-(methoxycarbonyl)-ethyl, 2-(ethoxycarbonyl)-ethyl, 2-(butoxycarbonyl)-ethyl, 2-(methylsulfonyl)-ethyl, 2-(ethylsulfonyl)-ethyl, 2-(butylsulfonyl)-ethyl, 3-(N,N-diethylamino)-propyl, 3-(N,N-dimethylamino)-propyl, 3-(N,N-dibutylamino)-propyl, 2-phenoxyethyl, 3-phenoxypropyl, 4-phenoxypropyl; 2-methoxyethyl, 2-ethoxyethyl, 2-propoxyethyl, 2-butoxyethyl, 3-methoxypropyl, 3-ethoxypropyl, 3-propoxypropyl, 3-butoxypropyl, 3-(2'-ethylhexoxy)-propyl; 2-(2'-hydroxyethoxy)-ethyl, 2-(3'-hydroxypropoxy)-ethyl, 2-(4'-hydroxybutoxy)-ethyl, 3-(2'-hydroxyethoxy)-propyl, 3-(3'-hydroxypropoxy)-propyl, 3-(4'-hydroxybutoxy)-propyl, 2-(2'-phenoxyethoxy)-ethyl, 3-(2'-phenoxyethoxy)-propyl, 2-(3'-phenoxypropoxy)-ethyl and 3-(3'-phenoxypropoxy)-propyl;

(2) unsubstituted or substituted cycloalkyl or polycycloalkyl;

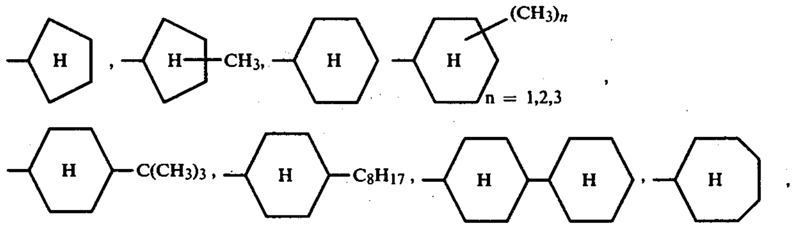

-continued

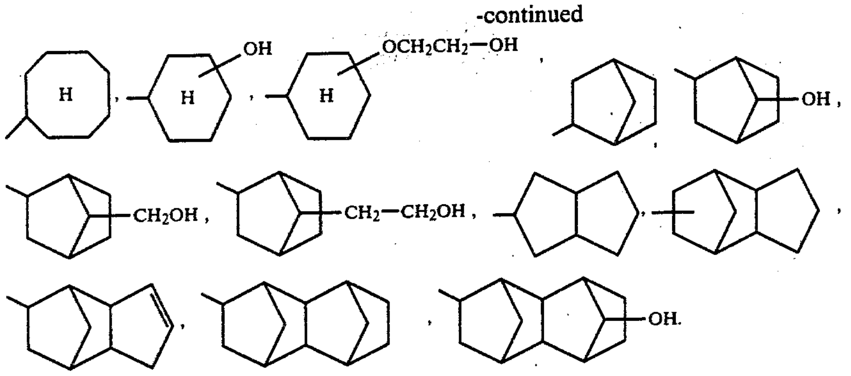

(3) unsubstituted or substituted phenylalkyl: $-CH_2-C_6H_5$, $-CH_2-CH_2-C_6H_5$,

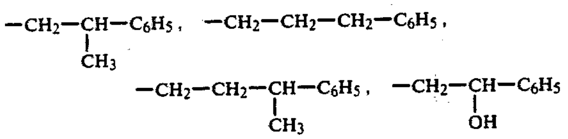

and $-C_6H_4-CH_3$ instead of $C_6H_5$; $-CH_2-C_6H_4-C_{12}H_{25}$, $-CH_2-C_6H_4-C_8H_{17}$, $-CH_2-C_6H_4-C_9H_{19}$, $-CH_2-C_6H_4-C_6H_{13}$.

(4) unsubstituted or substituted phenyl or naphthyl: phenyl, methylphenyl, dimethylphenyl, trimethylphenyl, ethylphenyl, diethylphenyl, triethylphenyl, propylphenyl, isopropylphenyl, butylphenyl, isobutylphenyl, sec.-butylphenyl, tert.-butylphenyl, hexylphenyl, octylphenyl, isooctylphenyl, dodecylphenyl, octadecylphenyl; chlorophenyl, 2,4-dichlorophenyl, 3,5-dichlorophenyl, bromophenyl; 3-trifluorophenyl, nitrophenyl, nitromethylphenyl; cyanophenyl, methylcyanophenyl; methoxyphenyl, dimethoxyphenyl, ethoxyphenyl, propoxyphenyl, diisopropoxyphenyl, butoxyphenyl, pentoxyphenyl, (2'-methoxyethyl)-phenyl, (2'-propoxyethyl)-phenyl, (3'-methoxypropyl)-phenyl, (3'-propoxypropyl)-phenyl; methoxycarbonylphenyl, ethoxycarbonylphenyl, butoxycarbonylphenyl, pentoxycarbonylphenyl, methoxyethylcarbonylphenyl, ethoxyethylcarbonylphenyl, propoxyethylcarbonylphenyl; methylsulfonylphenyl, ethylsulfonylphenyl, butylsulfonylphenyl; phenylsulfonylphenyl, 4'-methylphenylsulfonylphenyl; N-methylaminocarbonylphenyl, N,N-dimethylcarbonylaminophenyl, N-ethylaminocarbonylphenyl, N,N-diethylaminocarbonylphenyl, N-butylaminocarbonylphenyl, N,N-dibutylaminocarbonylphenyl, N-hexylaminocarbonylphenyl, N-(2'-ethylhexylamino)-carbonylphenyl; N-methylsulfamoylphenyl, N,N-dimethylsulfamoylphenyl, N-ethylsulfamoylphenyl, N,N-diethylsulfamoylphenyl, N-butylsulfamoylphenyl, N,N-dibutylsulfamoylphenyl, N-pentylsulfamoylphenyl, N-(2'-ethylhexyl)-sulfamoylphenyl, N-(2'-hydroxyethyl)-sulfamoylphenyl, N,N-bis-(2'-hydroxyethyl)-sulfamoylphenyl, N-(2'-cyanoethyl)-sulfamoylphenyl, N,N-bis-(2'-cyanoethyl)-sulfamoylphenyl, N-(3-methoxypropyl)-sulfamoylphenyl, N-cyclohexylsulfamoylphenyl, N-phenylsulfamoylphenyl, N-(methylphenyl)-sulfamoylphenyl; benzyloxyphenyl, (2'-phenylethoxy)-phenyl, (3'-phenylpropoxy)-phenyl, (4'-phenylbutoxy)-phenyl; phenoxyphenyl, 2-chlorobenzyloxyphenyl, 4-chlorobenzyloxyphenyl, 2-cyanobenzyloxyphenyl; 4-phenoxyphenyl, 4-(4'-chlorophenoxy)-phenyl.

Of the radicals specified for $B^1$ the following are preferred: linear or branched $C_1$ to $C_8$ alkyl such as methyl, ethyl, propyl, isopropyl, butyl, isobutyl, pentyl, hexyl, heptyl, 1,1,3-trimethylbutyl, 1-methylbutyl, 1,1-dimethylpropyl, 2,3-dimethylpentyl-(3), octyl, 2-ethylhexyl; hydroxyalkyl of two to four carbon atoms such as 2-hydroxyethyl, 3-hydroxypropyl, 2-hydroxypropyl; alkoxyalkyl of a total of three to ten carbon atoms such as 2-methoxyethyl, 2-ethoxyethyl, 2-butoxyethyl, 3-methoxypropyl, 3-ethoxypropyl, 3-butoxypropyl, 2-(2'-methoxyethoxy)-ethyl, 2-(2'-ethoxyethoxy)-ethyl, 2-(2'-methoxyethoxy)-propyl, 2-(2'-ethoxyethoxy)-propyl; hydroxyalkoxyalkyl of a total of four to eight carbon atoms such as 2-(2'-hydroxyethoxy)-ethyl, 2-(2'-hydroxypropoxy)-ethyl, 2-(3'-hydroxypropoxy)-ethyl, 3-(2'-hydroxyethoxy)-propyl, 3-(3'-hydroxypropoxy)-propyl, 3-(4'-hydroxybutoxy)-propyl, 2-(4'-hydroxybutoxy)-ethyl; phenylalkyl of a total of seven to ten carbon atoms such as benzyl, 2-phenylethyl, 2-phenylpropyl, 3-phenylpropyl, 4-phenylbutyl, 2-hydroxy-2-phenylethyl; phenoxyalkyl of two to four carbon atoms in the alkyl and phenoxyalkoxyalkyl of a total of four to six carbon atoms in the alkoxyalkyl (equal to a total of ten to twelve carbon atoms) such as 2-phenoxyethyl, 3-phenoxypropyl, 2-(2'-phenoxyethoxy)-ethyl, 3-(2'-phenoxyethoxy)-propyl, 3-(3'-phenoxypropoxy)-propyl, N,N-dialkylaminoalkyl of a total of four to twelve carbon atoms in the alkyl such as N,N-dimethylaminoethyl, N,N'-diethylaminoethyl, N,N-dibutylaminoethyl, N,N-dimethylaminopropyl, N,N'-diethylaminopropyl, N,N-dibutylaminopropyl; cyclohexyl; phenyl or phenyl in which one to three hydrogen atoms have been replaced by $C_1$ to $C_4$ alkyl, methoxy, ethoxy, chloro or bromo and/or one hydrogen atom has been replaced by alkoxycarbonyl of a total of two to five carbon atoms, N-alkylaminocarbonyl of one to four carbon atoms in the alkyl, N,N-dialkylsulfamoyl of one to four carbon atoms per alkyl, phenoxy or benzyloxy such as 4-tolyl, 4-ethylphenyl, 2,5-dimethylphenyl, 2,4-dimethylphenyl, 4-butylphenyl, 4-tert.-butylphenyl, p-chlorophenyl, p-bromophenyl, 2-methyl-4-chlorophenyl, 4-methoxyphenyl, 4-ethoxyphenyl, 3-methoxycarbonylphenyl, 3-ethoxycarbonylphenyl, 3-butoxycarbonylphenyl, 3-N-methylaminocarbonylphenyl, 3-N-ethylaminocarbonylphenyl, 3-N-butylaminocarbonylphenyl, N,N-diethylsulfamoylphenyl, N,N-dimethylsulfamoylphenyl, N,N-dibutylsulfamoylphenyl, N-ethyl-N-butylsulfamoylphenyl. Preferred examples of

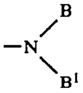 are —NH—CH(CH$_3$)$_2$, —NH—C$_3$H$_7$(n), —NH—C$_4$H$_9$(n), —NH—C$_5$H$_{11}$(n), 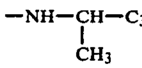

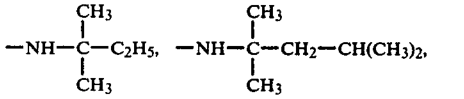

—NH—CH(CH(CH$_3$)$_2$)$_2$, 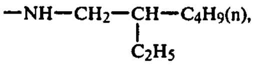

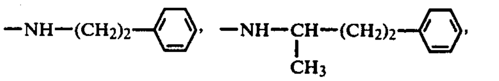

—NH—(CH$_2$)$_3$—OC$_2$H$_5$, 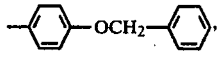

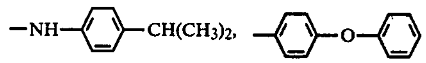

and 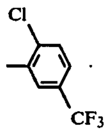

For tinctorial reasons and because of advantages in use those dyes are particularly preferred in which

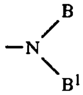

is one of the following groups:

—NH—CH(CH$_3$)$_2$, —NH—C$_3$H$_7$(n), —NH—C$_4$H$_9$(n),

—NH—C$_5$H$_{11}$(n), 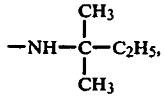

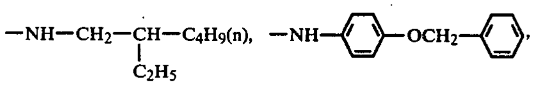

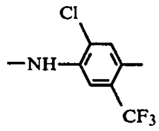 and —NH—(CH$_2$)$_3$—OC$_2$H$_5$.

The group

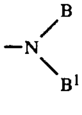

may moreover be a five-membered, six-membered or seven-membered saturated heterocyclic radical. Specific examples are the radicals of pyrrolidine, piperidine, morpholine, thiomorpholine, piperazine, hexamethyleneimine, N'-methylpiperazine or N'-ethylpiperazine. Piperidine and morpholine are preferred.

Examples of substituted α-anthraquinonyl or β-anthraquinonyl having zero to six substituents for A are those having the general formulae:

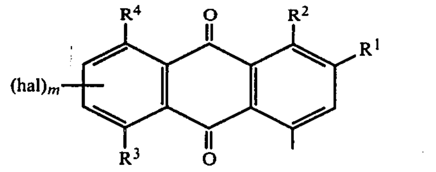

(IIa), (n=1)

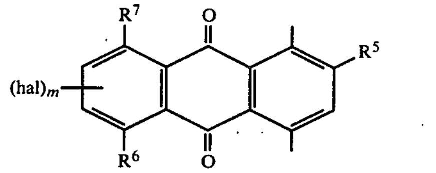

(IIb), (n=2)

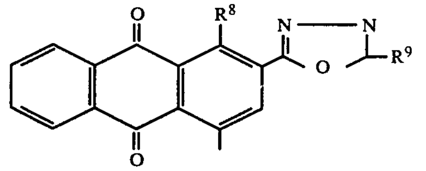

(IIc)

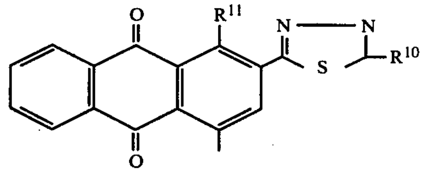

(IId).

In the formulae (IIa) to (IId) hal, and $R^1$ to $R^{11}$ present the following substituents:

hal: chloro, bromo; m=1, 2 or preferably 0 (zero); $R^1$: hydrogen, chloro, bromo, methyl, ethyl, $C_1$ to $C_6$ alkoxy, phenoxy, alkylphenoxy or one to six carbon atoms in the alkyl, chlorophenoxy, bromophenoxy, $C_1$ to $C_6$ alkylthio, phenylthio, alkylphenylthio of one to six carbon atoms in the alkyl, acetyl, propionyl, benzoyl, methylbenzoyl, dimethylbenzoyl, trimethylbenzoyl, phenoxybenzoyl, $C_1$ to $C_6$ alkoxycarbonyl, N-alkylaminocarbonyl or N,N-dialkylaminocarbonyl of one to six carbon atoms per alkyl, phenylaminocarbonyl, alkylphenylaminocarbonyl of one to six carbon atoms in the alkyl, cyano, nitro, $C_1$ to $C_6$ alkylsulfonyl, phenylsulfonyl, $C_1$ to $C_6$ alkylphenylsulfonyl, N-alkylsulfamoyl or N,N-dialkylsulfamoyl of one to six atoms per alkyl, N-alkoxyalkylsulfamoyl or N,N-bisalkoxyalkylsulfamoyl of three to twelve carbon atoms per alkoxyalkyl. $R^2$: hydrogen, hydroxy, $C_1$ to $C_4$ alkoxy, amino, $C_1$ to $C_8$ alkylamino; $C_1$ to $C_8$ alkylamino bearing hydroxy, $C_1$ to $C_4$ alkoxy, cyano or carbonylalkoxy of one to five carbon atoms as substituents, phenylamino; phenylamino bearing $C_1$ to $C_5$ alkyl, methoxy, ethoxy, phenoxy, chloro or bromo as substituents; $C_1$ to $C_6$ alkylthio; phenylthio; phenylthio bearing $C_1$ to $C_5$ alkyl as a substituent;

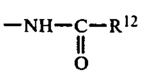

in which $R^{12}$ is saturated linear or branched $C_1$ to $C_5$ alkyl; phenyl; or phenyl bearing $C_1$ to $C_4$ alkyl, bromo, chloro, methoxy or ethoxy as a substituent. $R^3$ and $R^4$: hydrogen, hydroxy, $C_1$ to $C_4$ alkoxy, linear or branched $C_1$ to $C_4$ alkylamino;

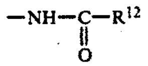

in which $R^{12}$ has the above meanings; the radicals $R^3$ and $R^4$ being identical or different; one of the radicals $R^3$ and $R^4$ may also be nitro.

$R^5$: hydrogen or methoxy.

$R^6$: nitro or the groups specified for $R^7$ in which case $R^7$ and $R^6$ may be identical or different.

$R^7$: hydrogen, hydroxy, saturated linear or branched $C_1$ to $C_5$ alkylamino in which the alkyl may bear $C_1$ to $C_4$ alkoxy, hydroxy or cyano as a substituent.

$R^8$: $C_1$ to $C_5$ alkylamino or hydroxy.

$R^9$: phenyl; phenyl bearing $C_1$ to $C_6$ alkyl, $C_1$ to $C_4$ alkoxy, chloro or bromo as a substituent; $C_1$ to $C_{10}$ alkyl; $C_1$ to $C_{10}$ alkyl in which one or two hydrogen atoms are replaced by chloro, bromo, hydroxy, cyano, $C_1$ to $C_4$ alkoxy, dialkylamino of one to four carbon atoms per alkyl, carbamoyl, carbonylalkoxy of a total of two to nine carbon atoms, $C_1$ to $C_5$ alkylthio, phenyl or phenoxy, one or two hydrogen atoms in the phenyl substituents being optionally replaced by chloro, bromo, $C_1$ to $C_4$ alkyl, methoxy, ethoxy, alkoxycarbonyl, alkylthio, alkylsulfonyl and/or N-alkylsulfamoyl of one to four carbon atoms per alkyl; $C_1$ to $C_5$ alkylthio; $C_7$ to $C_{10}$ phenylalkylthio; phenylthio; or phenylthio bearing chloro, bromo, $C_1$ to $C_4$ alkyl, methoxy or ethoxy as a substituent.

$R^{10}$: phenyl, $C_1$ to $C_5$ alkyl; $C_1$ to $C_8$ alkylthio; $C_3$ to $C_8$ alkoxyalkyl; $C_1$ to $C_5$ alkylamino; methoxy; ethoxy; or phenalkylthio of one to five carbon atoms in the alkyl.

$R^{11}$: amino or $C_1$ to $C_5$ alkylamino.

Furthermore A may for example be a radical of the formula (III)

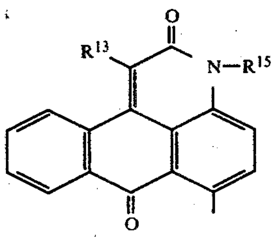

or (IV)

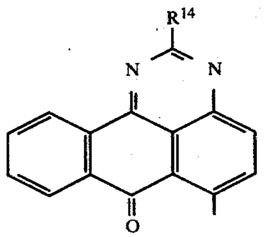

In these formulae the radicals $R^{13}$ to $R^{15}$ have the following meanings:

$R^{13}$: hydrogen, $C_1$ to $C_6$ alkoxycarbonyl, $C_1$ to $C_4$ alkylcarbonyl, benzoyl or cyano.

$R^{15}$: hydrogen, $C_1$ to $C_5$ alkyl or phenyl;

$R^{14}$: hydrogen, $C_1$ to $C_3$ alkyl, phenyl or $C_1$ to $C_5$ alkylphenyl.

Preferred substituents are as follows:

For $R^1$: hydrogen, bromo, chloro, acetyl, carbonylalkoxy of one to five carbon atoms in the alkyl, benzoyl, methylbenzoyl, dimethylbenzoyl, trimethylbenzoyl, methoxybenzoyl, ethoxybenzoyl, phenoxybenzoyl, N-alkylaminocarbonyl of one to four carbon atoms in the alkyl such as N-propylaminocarbonyl, nitro, cyano, $C_1$ to $C_4$ alkylsulfonyl such as methylsulfonyl, phenylsulfonyl, methylphenylsulfonyl, $C_1$ to $C_4$ alkoxy such as methoxy;

for $R^2$: hydrogen, hydroxy, amino, $C_1$ to $C_4$ alkylamino, such as methylamino, isopropylamino, isobutylamino; phenylamino; phenylamino bearing $C_1$ to $C_5$ alkyl, methoxy, ethoxy, $C_2$ to $C_4$ C-acyloxy as substituents such as methylphenylamino, methoxyphenylamino or 4-acetoxyphenylamino; $C_1$ to $C_4$ alkoxy such as methoxy;

for $R^3$ and $R^4$: hydrogen, hydroxy, amino, the substituents being identical or different;

for $R^5$, $R^6$ and $R^7$: hydrogen;

for $R^8$: amino;

for $R^9$: phenoxyalkyl of one to six carbon atoms in the alkyl such as phenoxymethyl, 3-phenoxypropyl, 5'-phenoxypentyl, 2'-(dichlorophenoxy)-ethyl, 4-chloro-3-methylphenoxymethyl; phenalkyl of one to six carbon atoms in the alkyl such as 5'-(diphenyl)-pentyl, 3'-(4-methylphenyl)-propyl; $C_1$ to $C_5$ alkyl such as methyl, ethyl, propyl, butyl and phenyl;

for $R^{10}$: $C_1$ to $C_5$ alkyl, $C_1$ to $C_8$ alkylthio or phenalkylthio of two to four carbon atoms in the alkyl;

for $R^{11}$: amino;

for $R^{13}$: hydrogen;

for $R^{14}$: hydrogen, hydroxy, phenyl, $C_1$ to $C_3$ alkylphenyl such as methylphenyl; halophenyl such as chlorophenyl;

for $R^{15}$: hydrogen.

Formulations according to the invention are advantageously prepared by grinding a suspension of from 15 to 40 and preferably from 20 to 35 parts of dye (I), from 4 to 10 parts of dispersing agent, from 5 to 15 parts of water retention agent, from about 0.5 to 1.5 parts of disinfectant in about 75.5 to 33.5 parts of water in a stirred ball mill, bead mill or sand mill until the particle size is about 0.5 micron or less. Dispersions which are stable in storage are thus obtained.

The dispersing agents used may be anionic and nonionic dispersing agents commonly used for the production of finely particled formulations of disperse dyes. Examples of anionic dispersing agents are lignin sulfonates, salts of phenol-formaldehyde-sodium sulfite condensation products (German Laid-Open Application DOS No. 23 01 638), salts of 2-naphthalenesulfonic acid-formaldehyde condensation products, salts of phenolsulfonic acid-urea-formaldehyde condensation products, and salts of condensation products from phenolsulfonic acid, urea and formaldehyde which have been subsequently condensed with phenol and formaldehyde.

Ethylene oxide and propylene oxide-ethylene oxide adducts are particularly suitable as nonionic dispersing agents. These are described for example in U.S. Pat. Nos. 2,979,528 and 3,841,888.

The amount of dispersing agent depends on the dye and on its concentration in the dispersion; as a rule the amount of dispersing agent is from 4 to 10% by weight based on the formulation.

Particularly suitable water retention agents include glycols such as ethylene glycol, propylene glycol, diethylene glycol and preferably dipropylene glycol. The amount used is generally from 5 to 15% and preferably from 8 to 12% by weight based on the formulation.

Dyes of the formula (I) may be prepared by reacting a compound of the formula (V):

$$A-(NH_2)_n \quad (V)$$

with a chlorotriazine of the formula (VI)

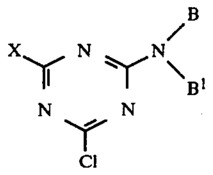 (VI)

in which A, X, B and $B^1$ have the above meanings in an inert solvent in the presence of absence of a base (method (a)).

Another method is by first reacting the compound $A-NH_2$ unilaterally with 1 mole of a dichlorotriazine of the formula (VII):

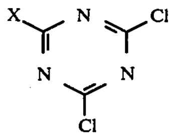 (VII)

and then replacing the remaining chlorine atom by the radical

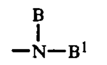

in a conventional manner (method (b)). These reactions are also advantageously carried out in an inert solvent or diluent.

Examples of suitable inert solvents or diluents are aromatic hydrocarbons, aromatic chlorohydrocarbons, such as benzene, toluene, xylene, chlorobenzene, dichlorobenzene, trichlorobenzene, nitrobenzene and N,N-dialkylcarboxamides such as N,N-dimethylformamide or N-methylpyrrolidone.

Aprotic polar solvents such as N,N-dimethylformamide and N-methylpyrrolidone are particularly suitable for the unilateral reaction (method (b)).

In method (a) the reaction is carried out as a rule at temperatures of from 60° to 180° C. The reaction is over after from two to ten hours. The reaction product is isolated by a conventional method.

The unilateral reaction according to variant (b) is carried out at temperatures of from 40° to 120° C. and preferably from 45° to 80° C. 1 or 2 moles of the dichlorotriazine (VII) are used per mole of (V). The amount of (VII) depends on whether A has one or two reactive amino groups and in the case of two reactive amino groups on whether both these groups or only one of them is to be reacted. The unilateral reaction is generally over within one hour to three hours in the polar aprotic solvent. The amount stoichiometrically required or an excess of the amine forming the basis of the radical

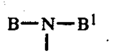

is then added and the mixture is kept at 60° to 180° C. and preferably at 70° to 130° C. until all the chlorine has been exchanged. The reaction product is precipitated by dilution with water and then isolated from the reaction mixture.

Dye formulations which contain a dye or mixture of dyes of the formula (VIII):

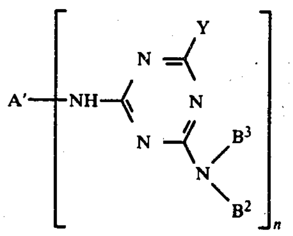 (VIII)

are valuable industrially and therefore preferred.

In the formula (VIII) A' is one of the radicals of the formulae

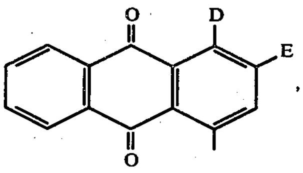 (Xa)

,

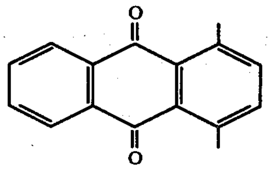 (Xb)

,

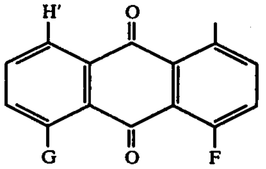 (Xc)

,

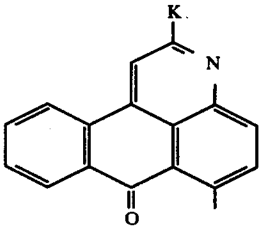 (Xd)

and

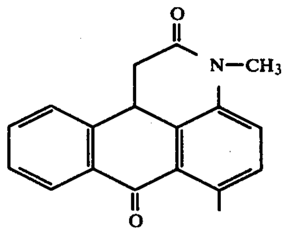 (Xe)

, in which the substituents D, E, H, F, G and K stand for the following radicals:

D: hydroxy; amino; $C_1$ to $C_4$ alkylamino; phenylamino; phenylamino bearing methyl, methoxy, chloro or bromo as a substituent in the 4-position; alkylcarbonylamino of one to three carbon atoms in the alkyl; benzoylamino;

E: acetyl, methoxycarbonyl, ethoxycarbonyl, propoxycarbonyl, butoxycarbonyl, benzoyl, 4-methylbenzoyl, 2,4,6-trimethylbenzoyl, 4-methoxybenzoyl, 4-phenoxybenzoyl, N-propylaminocarbonyl, nitro, cyano, methylsulfonyl, phenylsulfonyl, 4-methylphenylsulfonyl, bromo, methoxy, 2-oxadiazolyl or 2-thiodiazolyl which bear in the 5-position the substituents specified for $R^9$ and $R^{10}$;

F: hydrogen; hydroxy; amino; $C_1$ to $C_5$ alkylamino;

G: hydroxy; amino; phenylamino; benzoylamino; alkylcarbonylamino of one to three carbon atoms in the alkyl;

H': hydrogen; hydroxy; phenylamino; one of the substituents G and H may also be nitro;

K: hydrogen, hydroxy, methyl, phenyl, 4-methylphenyl; 4-chlorophenyl;

Y: in the formula (VIII): 4-chlorophenyl; 4-bromophenyl; 4-methoxyphenyl; 3,N,N-diethylsulfamoylphenyl, p-methylphenyl; p-isopropylphenyl; methyl; ethyl; and particularly phenyl.

In the formula (VIII), $B^2$ is $C_1$ to $C_8$ alkyl such as methyl, ethyl, propyl, isopropyl, butyl, isobutyl, n-pentyl, 1-methylbutyl, 1,1-dimethylbutyl, 2,4-dimethylpentyl-(2), 2,3-dimethylpentyl-(3), hexyl, isohexyl, heptyl, isoheptyl, n-octyl, isooctyl, 2-ethylhexyl, 2-hydroxyethyl; alkoxyalkyl of a total of three to seven carbon atoms such as methoxyethyl, ethoxyethyl, butoxyethyl, methoxypropyl, ethoxypropyl, propoxypropyl, butoxypropyl or 3-(4'-hydroxybutoxy)-propyl; phenalkyl of a total of seven to ten carbon atoms such as benzyl, 2-phenylethyl, 4-phenylbutyl-(2) or 3-phenylpropyl; phenoxyalkyl of two to four carbon atoms in the alkyl such as 2-phenoxyethyl or 3-phenoxypropyl; phenoxyalkoxyalkyl of four to six carbon atoms in the alkoxyalkyl such as 2-(2'-phenoxyethoxy)-ethyl or 3-(2'-phenoxyethoxy)-propyl; cyclohexyl; phenyl or phenyl in which one to three hydrogen atoms are replaced by methyl, methoxy, ethoxy, chloro or bromo and the substituents may be identical or different, or one hydrogen atom is replaced by fluoro, trifluoromethyl, phenalkoxy of seven to eight carbon atoms, carbonylalkoxy of a total of two to five carbon atoms, alkylaminocarbonyl or dialkylsulfamoyl of one to four carbon atoms per alkyl or phenoxy such as methylphenyl, dimethylphenyl, trimethylphenyl, chlorophenyl, fluorophenyl, 2-chloro-4-methylphenyl, 2-chlorotrifluoromethylphenyl, ethylphenyl, isopropylphenyl, bromophenyl, methoxyphenyl, ethoxyphenyl, 4-benzyloxyphenyl, 4-(2'-chlorobenzyloxy)-phenyl, 4-(β-phenylethoxy)-phenyl, 3-methoxycarbonylphenyl, 3-butoxycarbonylphenyl, 3-ethoxycarbonylphenyl, 3-N-methylaminocarbonylphenyl, 3-N-ethylaminocarbonylphenyl, 3-N-butylaminocarbonylphenyl, N,N-dimethylsulfamoylphenyl, N,N-diethylsulfamoylphenyl, N,N-dibutylaminosulfamoylphenyl or N-ethyl-N-butylsulfamoylphenyl and $B^3$ is hydrogen or the group

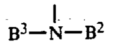

is a piperidine or morpholine radical.

Formulations which contain one or more than one dye of the formula (IX):

(IX)

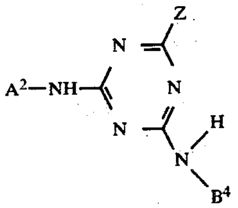

are particularly preferred for technical and tinctorial reasons.

In the formula (IX) $A^2$ is a radical of the formula (Xa) or (Xc) in which D, E, F, G and H have the following meanings:

D: amino;

E: acetyl, benzoyl, methoxy, bromo, phenylsulfonyl or p-methylsulfonyl;

F, G and H: hydroxy or amino, one or two of the radicals F, G and H being hydroxy;

Z: 4-chlorophenyl, 4-methoxyphenyl, 4-methylphenyl and preferably phenyl;

$B^4$: $C_3$ to $C_8$ alkyl such as isopropyl, n-butyl, isobutyl, n-pentyl, 2-methylbutyl-(2), 2,4-dimethylpentyl-(2), 2,3-dimethylpentyl-(3), n-octyl, 2-ethylhexyl; phenalkyl of eight to ten carbon atoms such as 2-phenylethyl, 1-methyl-3-phenylpropyl-(1), phenylethyl, alkoxyalkyl of a total of five to eight carbon atoms such as γ-ethoxypropyl, γ-propoxypropyl and γ-butoxypropyl; phenyl; phenyl bearing $C_1$ to $C_4$ alkyl, phenoxy, chloro and/or trifluoromethyl as a substituent or two substituents, such as 4-isopropylphenyl, 4-methylphenyl, 4-sec.-butylphenyl, 4-phenoxyphenyl, 4-chlorophenyl and 2-chloro-5-trifluoromethylphenyl.

Because of their outstanding technical and tinctorial properties, formulations of dyes of the following formulae (XI) and (XII)

(XI)

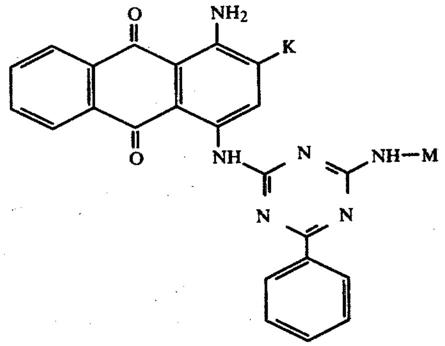

in which K and M have the meanings given in the following Table are particularly preferred.

| K | M |
|---|---|
| $-COCH_3$ | $-CH(CH_3)$ |

-continued
| K | M | |
|---|---|---|
| " | 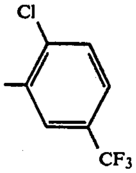 | |
| " | $-C_4H_9(n)$ | |
| " | 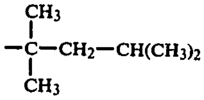 | (2,4-dimethyl-pentyl-(2)) |
| " | 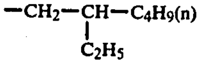 | |
| " | 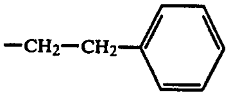 | |
| $-OCH_3$ | $-CH(CH_3)_2$ | |
| " | 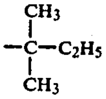 | |
| " | $-C_6H_{13}(n)$ | |
| " | $-CH[-CH(CH_3)_2]_2$ | (=2,4-dimethyl-pentyl-(3)) |
| Br | $-CH(CH_3)_2$ | |
| 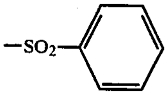 | 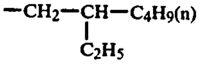 | |
| " | $-(CH_2)_3-O-C_2H_5$ | |
| 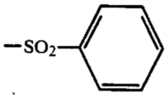 | $-C_5H_{11}(n)$ | |
| " | $-C_4H_9(n)$ | |
| 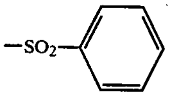 | 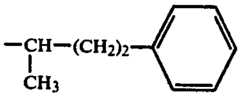 | |
| " | 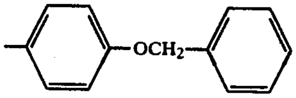 | |
| " | 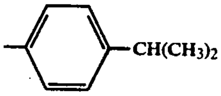 | |
| " | 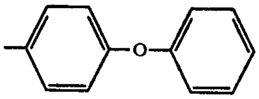 | |
| " | $-CH(CH_3)_2$ | |
| 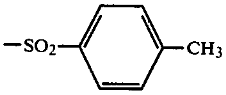 | 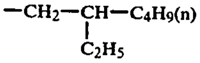 | |
| " | $-(CH_2)_3-OC_2H_5$ | |
| " | 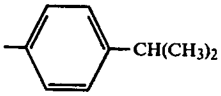 | |

-continued

| K | M |
|---|---|
| 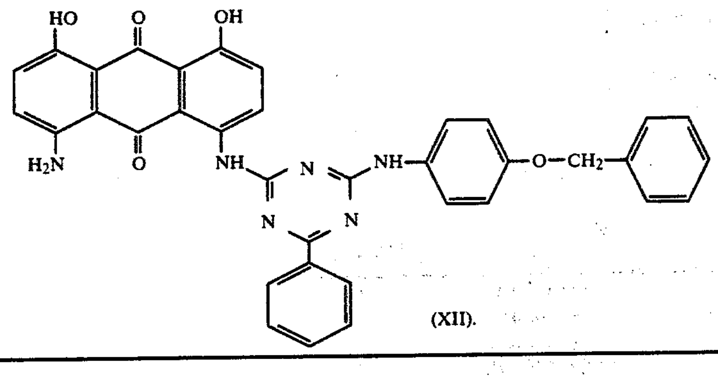 | |

(XII).

Dyes of the formulae (I), (VIII) and (IX) may from their constitution be denoted disperse dyes. They differ from vat dyes by their clearly better solubility in organic solvents.

A process is described however in German Pat. No. 1,811,796 which makes possible the printing of water-insoluble dyes onto cellulose or cellulosic textile material. The statements made in this patent specification regarding the process conditions also hold good for the dye formulations according to this invention.

Further methods are described in German Laid-Open Applications DOS Nos. 25 24 243 and 25 28 743 according to which the dye formulations according to this invention may be applied. The printing methods are preferred.

There are obtained with the dye formulations according to this invention dyeings and prints having very good fastness properties of which especially wet fastness, fastness to crocking, resistance to dry cleaning and light fastness may be mentioned. In the case of prints there is no bleeding of any white areas.

In the following Examples, which illustrate the invention, parts and percentages are by weight unless stated otherwise.

EXAMPLE 1

(a) Cotton cloth is printed by rotary film printing with a dye which consists of 10 parts of the dye of the formula:

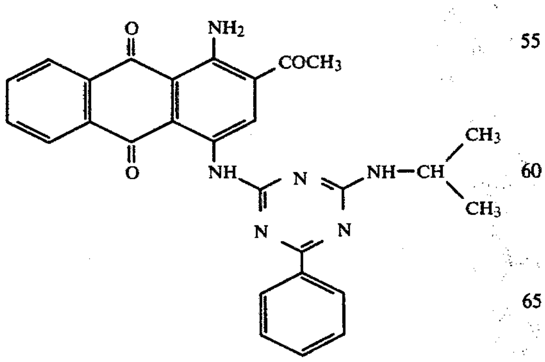

in the form of a 30% formulation (see (c) below), 100 parts of polyethylene oxide of a molecular weight of 300 and 790 parts of a 3% alginate thickening and the print is dried at 100° C. The print is then treated for one minute at 200° C. with hot air, rinsed cold, soaped at the boil, again rinsed cold and dried.

A blue print which is fast to light and washing is obtained on a white ground.

(b) The dye used is prepared as follows:

51 Parts of 1,4-diamino-2-acetylanthraquinone and 72 parts of 2-isopropylamino-4-phenyl-6-chloro-1,3,5-triazine in 200 parts of o-dichlorobenzene are stirred for two hours at 160° C. After cooling the whole is suction filtered and the residue washed with methanol, with 14% aqueous ammonia and then with water. After drying 78 parts of a blue powder is obtained.

(c) The dye obtained according to (b) is converted as follows into an aqueous formulation:

30 Parts of the dye 1(b), 6 parts of lignin sulfonate and 10 parts of dipropylene glycol are stirred into 50 parts of water and the suspension is ground in a sand mill until the particle size is 0.5 micron or less. Then 1 part of pentachlorophenol is added and the content of dye is adjusted by the addition of water to 30% (based on the formulation). The formulation obtained is stable in storage.

When the dye specified above is replaced by an equal amount of one of the dyes specified in the following Table, dyeings are obtained having equally good fastness properties and the hues stated in the Table. Mixtures of the dyes given in the Table may also be used. The dyes are prepared analogously to Example 1(b) and converted into formulations as described in Example 1(c).

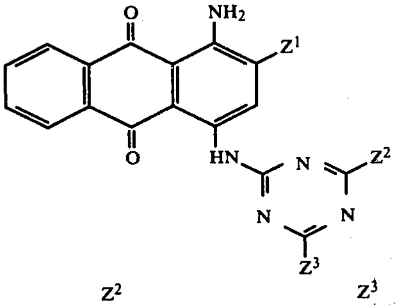
| Ex. | $Z^1$ | $Z^2$ | $Z^3$ | Hue |
|---|---|---|---|---|
| 2 | $-CO-CH_3$ | Phenyl | $-NH-CH_3$ | blue |
| 3 | " | " | $-NHC_2H_5$ | " |
| 4 | " | " | $-NHCH_2CH_2CH_3$ | " |
| 5 | " | " | $-NHCH_2CH_2CH_2CH_3$ | " |
| 6 | " | " | 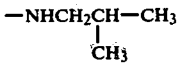 | " |
| 7 | " | " | $-NHCH_2CH_2CH_2CH_2CH_3$ | " |
| 8 | " | " | 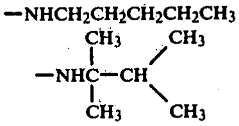 | |
| 9 | " | " | 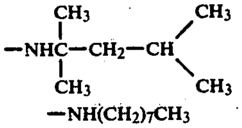 | " |
| 10 | " | " | $-NH(CH_2)_7CH_3$ | " |
| 11 | " | " |  | " |
| 12 | " | " | $-NHCH_2CH_2OCH_3$ | " |
| 13 | " | " | $-NHCH_2CH_2OC_2H_5$ | " |
| 14 | " | " | $-NHCH_2CH_2CH_2OCH_3$ | " |
| 15 | " | " | $-NHCH_2CH_2CH_2OC_2H_5$ | " |
| 16 | " | " | $-NH(CH_2)_3OC_4H_9$ | " |
| 17 | " | " | $-NH(CH_2)_3O(CH_2)_4OH$ | " |
| 18 | " | " | $-NHCH_2CH_2OH$ | " |
| 19 | " | " | 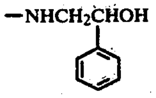 | " |
| 20 | " | " | 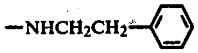 | " |
| 21 | " | " | 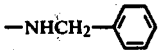 | " |
| 22 | " | " | 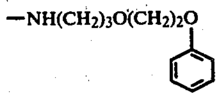 | " |
| 23 | " | " | 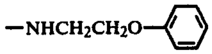 | " |
| 24 | " | " | 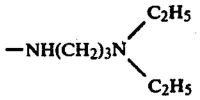 | " |
| 25 | " | " | 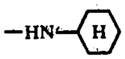 | " |
| 26 | " | " | 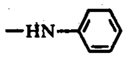 | " |
| 27 | " | " | 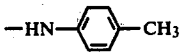 | " |
| 28 | " | " | 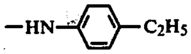 | " |

-continued
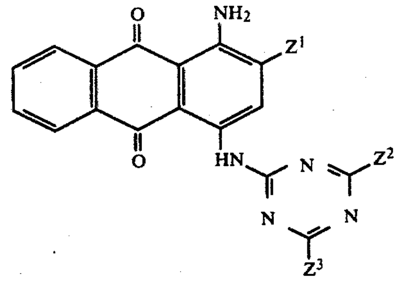
| Ex. | $Z^1$ | $Z^2$ | $Z^3$ | Hue |
|---|---|---|---|---|
| 29 | | " | 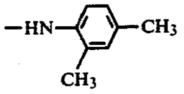 | " |
| 30 | " | " |  | " |
| 31 | " | " |  | " |
| 32 | " | " | 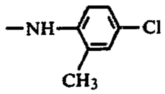 | " |
| 33 | " | " | 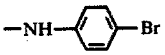 | " |
| 34 | " | " | 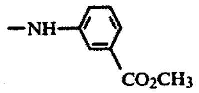 | " |
| 35 | " | " | 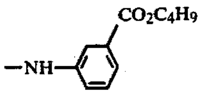 | " |
| 36 | " | " | 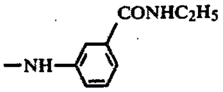 | " |
| 37 | " | " | 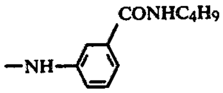 | " |
| 38 | " | " | 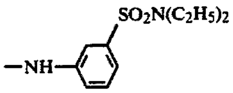 | " |
| 39 | " | " | 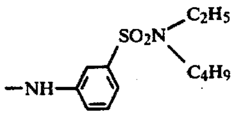 | " |
| 40 | " | " | 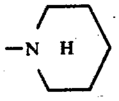 | " |
| 41 | " | " | 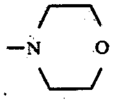 | " |
| 42 | " | " | 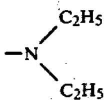 | " |

-continued
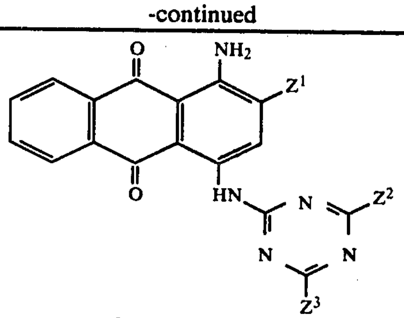
| Ex. | $Z^1$ | $Z^2$ | $Z^3$ | Hue |
|---|---|---|---|---|
| 43 | " | " | 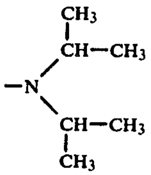 | " |
| 44 | " | 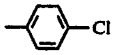 | $-NHC_2H_5$ | " |
| 45 | " | " | $-NHCH_2CH_2CH_3$ | " |
| 46 | " | " | 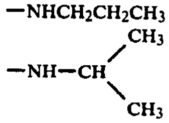 | " |
| 47 | " | " | $-NH(CH_2)_3CH_3$ | " |
| 48 | " | 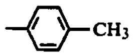 | $-NHCH_2CH_2CH_3$ | " |
| 49 | " | " | 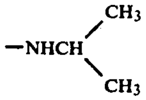 | " |
| 50 | " | " | 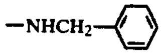 | " |
| 51 | " | 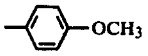 | 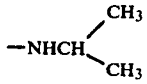 | " |
| 52 | " | " | $-NHCH_2CH_2CH_3$ | " |
| 53 | " | 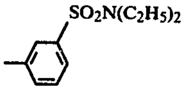 | 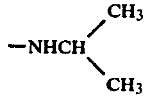 | " |
| 54 | $-COC_2H_5$ | 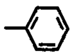 | " | " |
| 55 | $-COC_4H_9$ | " | " | " |
| 56 | $-COCH_3$ | -Phenyl | 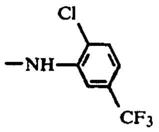 | " |
| 57 | " | " | 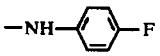 | " |
| 58 | " | " | 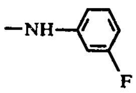 | " |
| 59 | " | " | 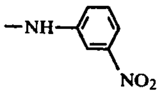 | " |
| 60 | " | " | 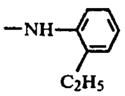 | " |

-continued

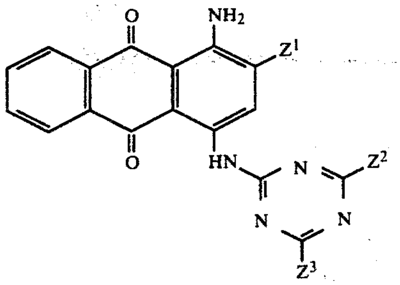

| Ex. | $Z^1$ | $Z^2$ | $Z^3$ | Hue |
|---|---|---|---|---|
| 61 | " | " | 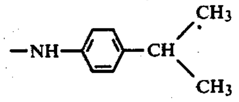 | " |
| 62 | " | " | 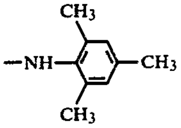 | " |
| 63 | " | " | 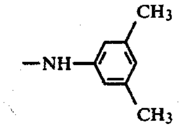 | " |
| 64 | " | " | 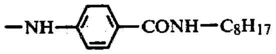 | " |
| 65 | " | " | $-NH-CH_2-CH_2-CN$ | " |

EXAMPLE 66

(a) A union fabric of polyester and cotton in the ratio by weight 67:33 is printed with a paste consisting of 20 parts of the dye of the formula:

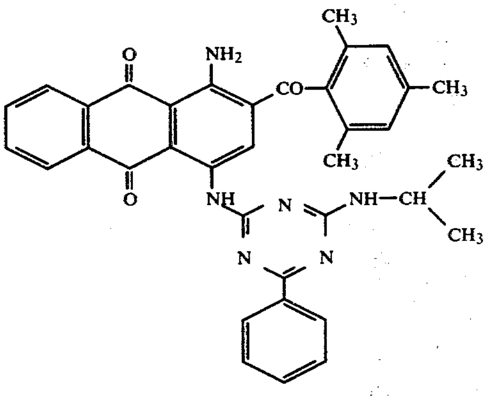

in the form of an aqueous formulation prepared according to (c) below, 120 parts of the reaction product of polyethylene oxide of a molecular weight of 300 with boric acid in a molar ratio 3:1 and 860 parts of a 10% alginate thickening. The print is dried at 105° C. and treated for six minutes with superheated steam at 180° C. It is then first rinsed with cold water, soaped at 80° C., rinsed cold and dried. A blue print which is fast to light and washing is obtained on a white ground.

(b) The compound specified in 66(a) is prepared as follows: 7.6 parts of 1,4-diamino-2-(2',4',6'-trimethylbenzoyl)-anthraquinone and 5.5 parts of 2-isopropylamino-4-phenyl-6-chloro-1,3,5-triazine in 80 parts of o-dichlorobenzene are stirred for three hours at 180° C. After cooling the whole is diluted with 40 parts of cyclohexane, suction filtered and the product washed with methanol and dried. 11.9 parts of a blue powder is obtained.

(c) The powder is converted into an aqueous formulation as described in Example 1(c).

When the dye in the paste is replaced by one of the dyes in the following Table dyeings with similar fastness properties are obtained in the hues given in the Table.

The dyes specified in the Table are prepared by methods analogous to that in Example 66(b).

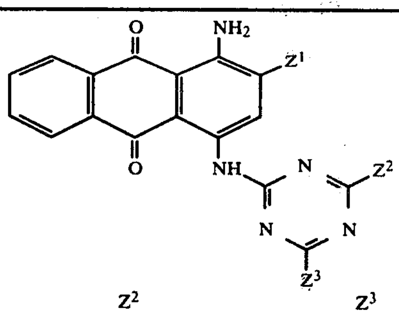
| Ex. | $Z^1$ | $Z^2$ | $Z^3$ | Hue |
|---|---|---|---|---|
| 67 | 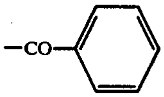 | 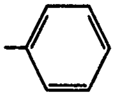 | 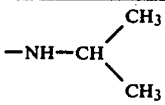 | blue |
| 68 | " | " | 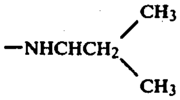 | " |
| 69 | " | " | 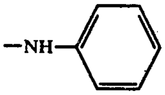 | " |
| 70 | 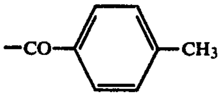 | " | 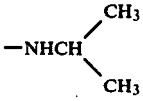 | " |
| 71 | " | " | $-NHCH_2CH_2OCH_3$ | " |
| 72 | " | " | 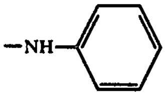 | " |
| 73 | " | 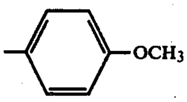 | 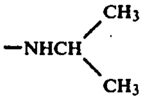 | " |
| 74 | 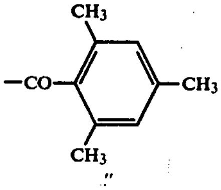 | 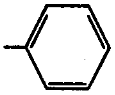 | $-NH(CH_2)_3OCH_3$ | " |
| 75 | " | " | $-NH(CH_2)_3CH_3$ | " |
| 76 | " | " | 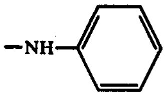 | " |
| 77 | 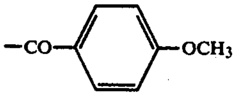 | $-CH_3$ | 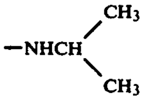 | " |
| 78 | " | 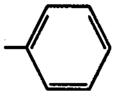 | 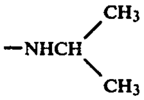 | " |
| 79 | " | " | $-NH(CH_2)_3CH_3$ | " |
| 80 | " | " | 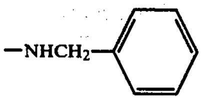 | " |
| 81 | " | " | $-NHCH_2CH_2CH_2OC_2H_5$ | " |
| 82 | " | " | 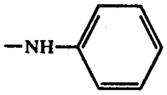 | " |

-continued
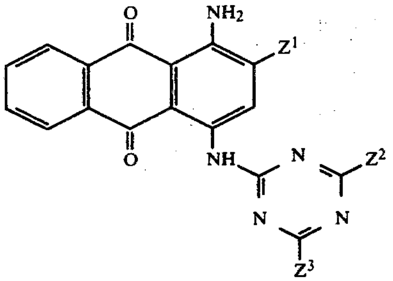
| Ex. | $Z^1$ | $Z^2$ | $Z^3$ | Hue |
|---|---|---|---|---|
| 83 | ″ | 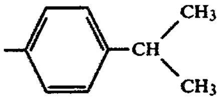 | 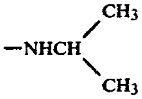 | ″ |
| 84 | 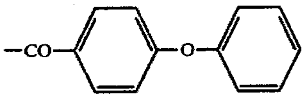 | 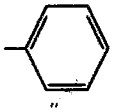 | 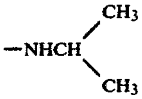 | ″ |
| 85 | ″ | ″ | $-NH(CH_2)_3OC_2H_5$ | ″ |
| 86 | ″ | ″ | 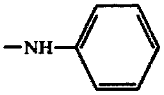 | ″ |
| 87 | ″ | 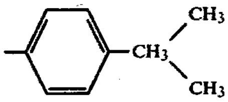 | 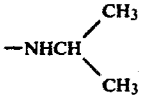 | ″ |
| 88 | $-COOCH_3$ | 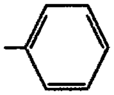 | 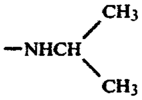 | ″ |
| 89 | ″ | ″ | $-NH(CH_2)_3CH_3$ | ″ |
| 90 | 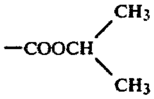 | ″ | 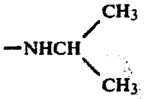 | ″ |
| 91 | ″ | ″ | 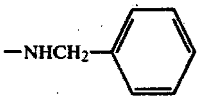 | ″ |
| 92 | 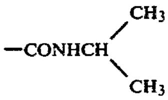 | ″ | 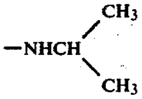 | ″ |
| 93 | ″ | ″ | $-NH(CH_2)_3CH_3$ | ″ |
| 94 | $-NO_2$ | ″ | 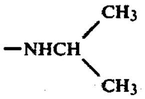 | ″ |
| 95 | ″ | ″ | $-NHCH_2CH_2CH_2CH_3$ | ″ |
| 96 | ″ | ″ | 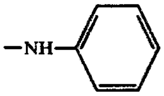 | ″ |
| 97 | $-CN$ | ″ | 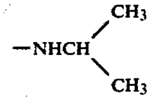 | ″ |
| 98 | ″ | ″ | $-NH(CH_2)_3OC_2H_5$ | ″ |
| 99 | ″ | 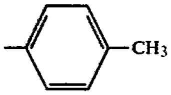 | $-NHCH(CH_3)_2$ | ″ |

-continued
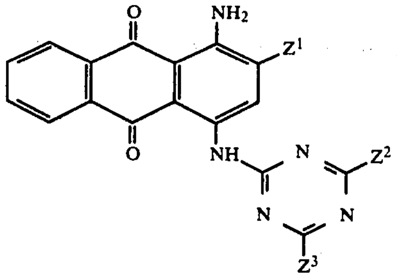
| Ex. | $Z^1$ | $Z^2$ | $Z^3$ | Hue |
|---|---|---|---|---|
| 100 | " | 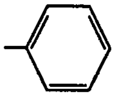 | 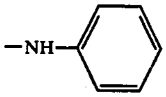 | " |
| 101 | $-SO_2CH_3$ | " | 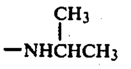 | " |
| 102 | 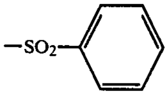 | " | 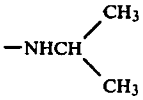 | " |
| 103 | " | " | $-NH(CH_2)_3OC_2H_5$ | " |
| 104 | " | " | 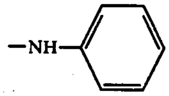 | " |
| 105 | 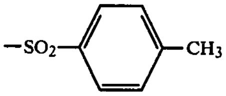 | " | $-NHCH_2CH_2CH_3$ | " |
| 106 | " | " | 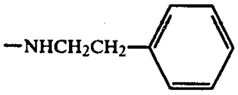 | " |
| 107 | 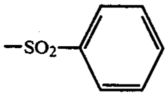 | 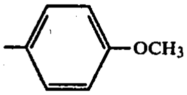 | 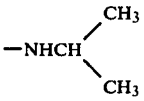 | " |
| 108 | $-OCH_3$ | 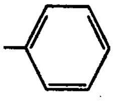 | 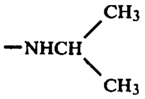 | " |
| 109 | $-OCH_3$ | 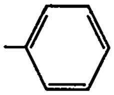 | $-NH(CH_2)_3OC_2H_5$ | " |
| 110 | " | 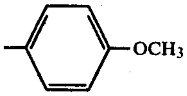 | $-NHCH_2CH_2CH_2CH_3$ | " |
EXAMPLE 111
(a) Cotton cloth is printed by roller printing with a print paste consisting of 15 parts of the dye of the formula:

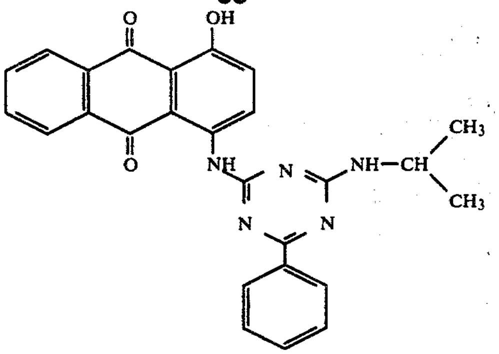

in the form of a 30% aqueous formulation, 110 parts of polyethylene oxide of a molecular weight of 350, 30 parts of the diethanolamide of oleic acid and 845 parts of a 10% alginate thickening. The print is dried at 100° C. and then fixed by a treatment with hot air at 195° C. for one minute. The print is finished off as described in Example 1. A fast red print on a white ground is obtained.

(b) The dye specified in Example 111(a) is prepared as follows: 12 parts of 1-amino-4-hydroxyanthraquinone and 13.5 parts of 2-isopropylamino-4-phenyl-6-chloro-1,3,5-triazine in 100 parts of o-dichlorobenzene are stirred for two hours at 170° C. After the whole has been cooled and diluted with a small amount of methanol it is suction filtered. The product is washed with methanol and dilute aqueous ammonia and dried. 18 parts of a red powder is obtained.

(c) The dye is converted as described in Example 1(c) into an aqueous formulation.

When the dye specified in Example 111(a) is replaced by an equal amount of one of the dyes specified in the following Table dyeings having similar fastness properties are obtained in the hues specified in the Table. The dyes are prepared analogously to Example 111(b).

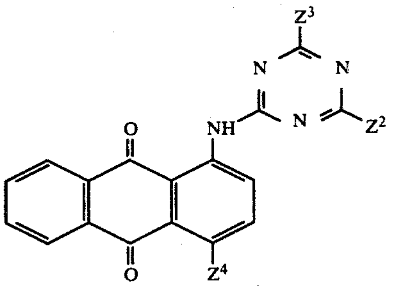

| Ex. | $Z^4$ | $Z^2$ | $Z^3$ | Hue |
|---|---|---|---|---|
| 112 | H | $-CH_3$ | 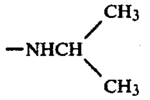 | yellow |
| 113 | H | $-C_3H_5$ | " | " |
| 114 | H | 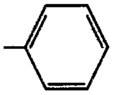 | 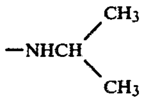 | " |
| 115 | H | " | $-NHCH_2CH_2OCH_3$ | " |
| 116 | H | " | $-NHCH_2CH_2-$ 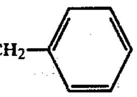 | " |
| 117 | H | " | $-NH-$ 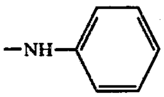 | " |
| 118 | H | 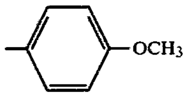 | 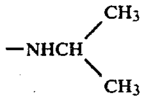 | " |
| 119 | H | 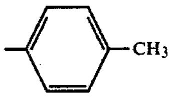 | 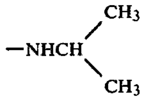 | " |
| 120 | OH | 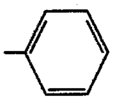 | $-NHC_2H_5$ | red |
| 121 | OH | " | 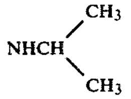 | " |
| 122 | OH | " | $-NH(CH_2)_3OC_2H_5$ | " |

-continued
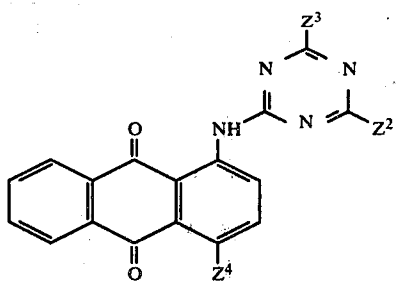
| Ex. | Z⁴ | Z² | Z³ | Hue |
|---|---|---|---|---|
| 123 | OH | " | 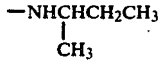 | " |
| 124 | OH | 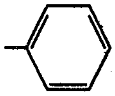 | 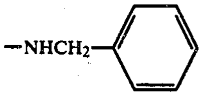 | red |
| 125 | OH | " | 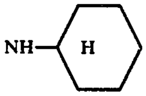 | " |
| 126 | OH | " | 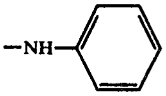 | " |
| 127 | OH | " | 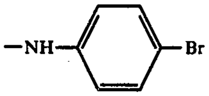 | " |
| 128 | OH | 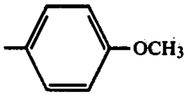 | 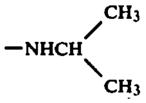 | " |
| 129 | OH | 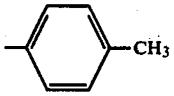 | 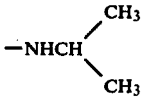 | " |
| 130 | 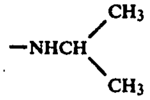 | 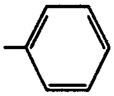 | 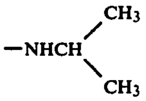 | blue |
| 131 | " | 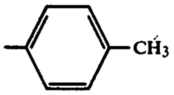 | " | " |
| 132 | " | 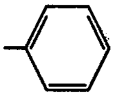 | 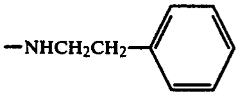 | " |
| 133 | 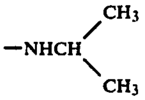 | 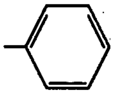 | 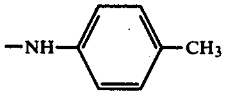 | " |
| 134 | $-NH_2$ | " | 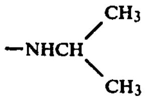 | " |
| 135 | " | " | 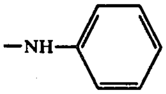 | " |

-continued
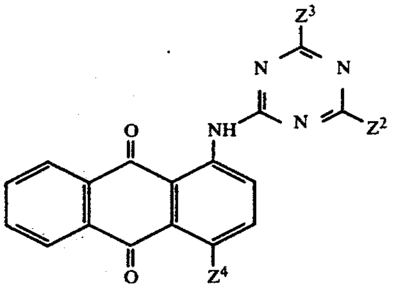
| Ex. | $Z^4$ | $Z^2$ | $Z^3$ | Hue |
|---|---|---|---|---|
| 136 | " | 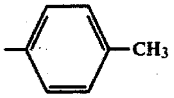 | $-NHCH(CH_3)_2$ | " |
| 137 | " | " | $-NHCH_2CH_2OCH_3$ | " |
| 138 | $-NHCH_3$ | 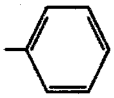 | 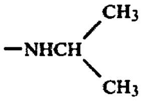 | " |
| 139 | " | " | $-NH(CH_2)_3CH_3$ | " |
| 140 | 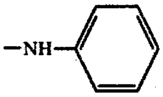 | " | 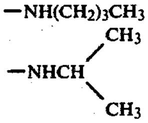 | " |
| 141 | 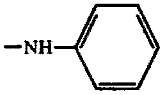 | 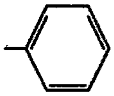 | 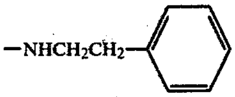 | " |
| 142 | " | " | $-NH(CH_2)_3OCH_3$ | " |
| 143 | 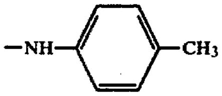 | " | 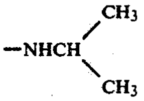 | " |
| 144 | " | " | $-NH(CH_2)_3OCH_3$ | " |
| 145 | " | 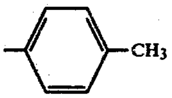 | 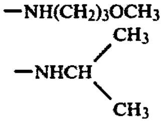 | " |
| 146 | " | 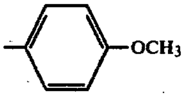 | " | " |
| 147 | 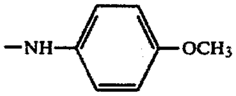 | 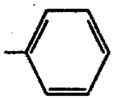 | 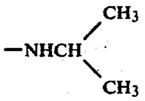 | " |
| 148 | " | " | $-NH(CH_2)_3CH_3$ | " |
| 149 | " | 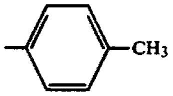 | $-NHCH_2CH_2CH_3$ | " |
| 150 | " | " | $-NHCH_2CH_2CH_2OCH_3$ | " |
| 151 | " | 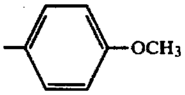 | 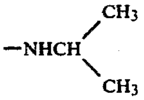 | " |
| 152 | $-NHCOCH_3$ | 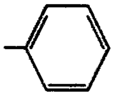 | " | red |
| 153 | 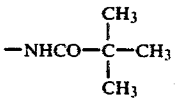 | " | " | " |

-continued
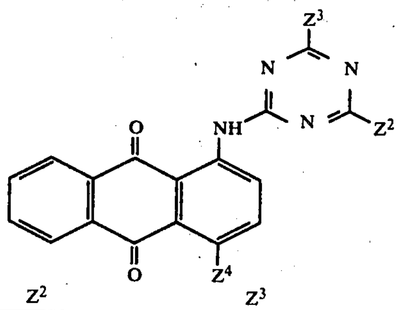
| Ex. | $Z^4$ | $Z^2$ | $Z^3$ | Hue |
|---|---|---|---|---|
| 154 | 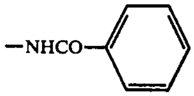 | " | " | " |
| 155 | 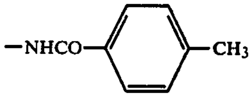 | " | " | " |
| 156 | 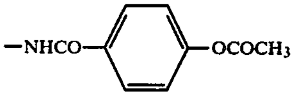 | 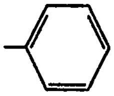 | " | " |
| 157 | 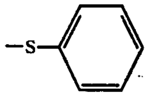 | 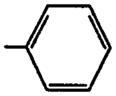 | 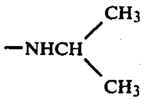 | " |
| 158 | " | " | 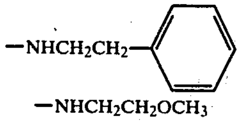 | " |
| 159 | " | 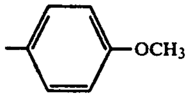 | $-NHCH_2CH_2OCH_3$ | " |
| 160 | " | 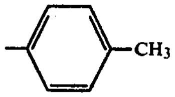 | 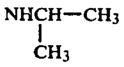 | " |
| 161 | $-Br$ | 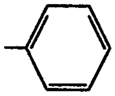 | 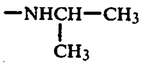 | yellow |
| 162 | $-Cl$ | " | " | " |
| 163 | $-OCH_3$ | " | " | orange |
| 164 | " | " | 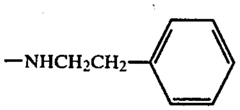 | " |
| 165 | 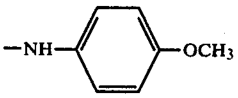 | 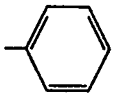 | $-NH-C_5H_{11}(n)$ | blue |
| 166 | " | " | 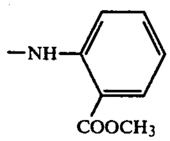 | " |
| 167 | " | " | $-NH-C_2H_5$ | " |
| 168 | " | " | $-NH-(CH_2)_3-OC_2H_5$ | " |
| 169 | " | " | $-NH(CH_2)_3-OCH_3$ | " |
| 170 | " | " | 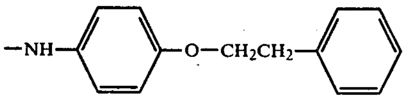 | " |

-continued

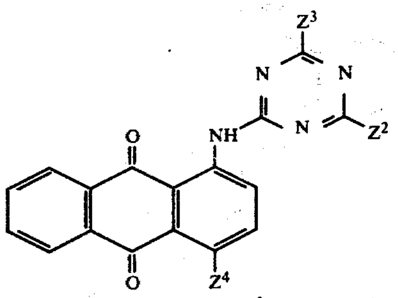

| Ex. | Z⁴ | Z² | Z³ | Hue |
|---|---|---|---|---|
| 171 | " | " | 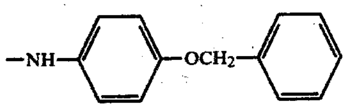 | " |
| 172 | " | " | 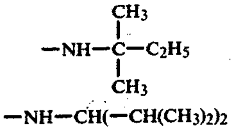 | " |
| 173 | " | " | $-NH-CH(-CH(CH_3)_2)_2$ | " |
| 174 | " | " | 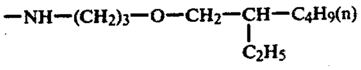 | " |
| 175 | " | " | 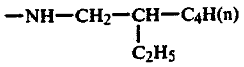 | " |

EXAMPLE 176

(a) Union cloth of polyester and cellulose in the ratio by weight 67:33 is screen printed with a dye formulation consisting of 30 parts of the dye of the formula:

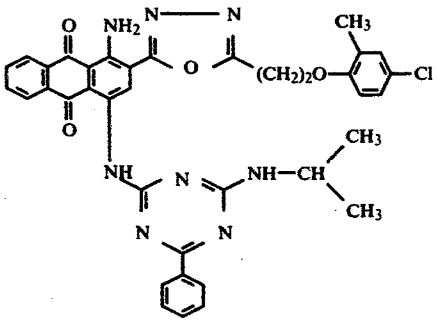

in the form of the formulation obtained according to (c) below, 100 parts of the reaction product of polyethylene oxide of molecular weight 300 with boric acid in a molar ratio of 3:1, 30 parts of the diethanolamide of oleic acid and 840 parts of a 3% alginate thickening and the print is dried at 110° C. It is then treated for five minutes at 185° C. with superheated steam and finished off as described in Example 1. A fast blue print on a white ground is obtained.

(b) The dye used in Example 176(a) is prepared as follows: 7 parts of the compound:

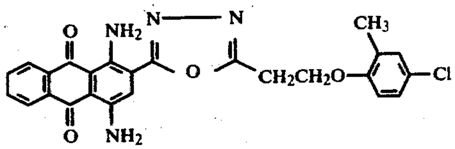

120 Parts of N-methylpyrrolidone and 5 parts of phenyldichloro-1,3,5-triazine are stirred for two hours at 70° to 80° C. 1.2 parts of isopropylamine is then added and the whole is stirred for another three hours at 80° C. The reaction mixture is suction filtered, the filtrate is diluted with water, the precipitate is suction filtered and dried. 7 parts of a blue dye powder is obtained.

(c) The dye is converted into an aqueous formulation as described in Example 1(c).

When one of the dyes specified in the following Table is used instead of the dye specified in Example 176 dyeings having similar fastness properties are obtained which have the hues set out in the Table. The dyes are prepared analogously to Example 176(b).

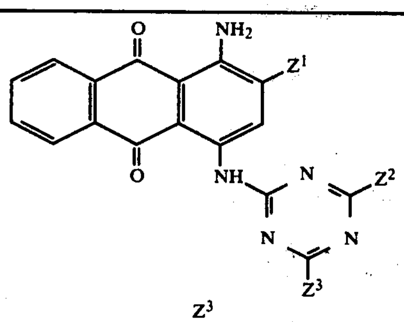
| Ex. | $Z^1$ | $Z^3$ | $Z^2$ | Hue |
|---|---|---|---|---|
| 177 | 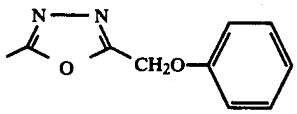 | 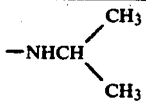 | 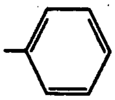 | blue |
| 178 | " | $-NH(CH_2)_3OC_2H_5$ | " | " |
| 179 | 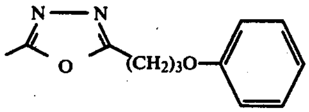 | 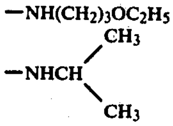 | " | " |
| 180 | " | 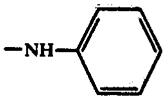 | " | " |
| 181 | 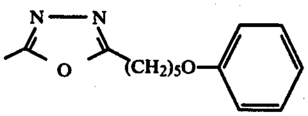 | 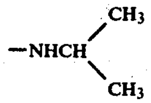 | " | " |
| 182 | " | $-NHCH_2CH_2CH_3$ | " | " |
| 183 | 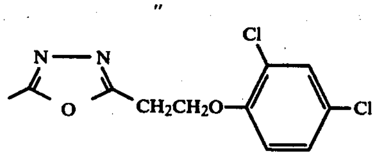 | 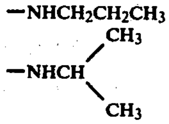 | " | " |
| 184 | " | $-NHC_4H_9$ | " | " |
| 185 | 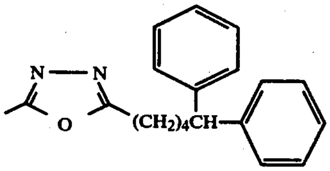 | $-NH-CH(CH_3)_2$ | " | |
| 186 | 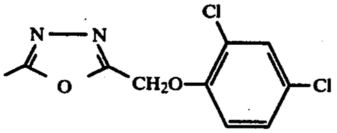 | 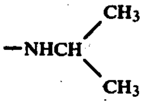 | " | " |
| 187 | " | 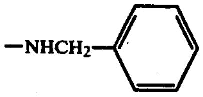 | " | " |
| 188 | 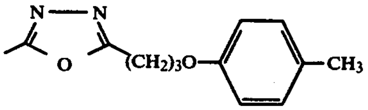 | 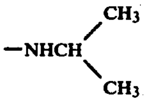 | " | " |
| 189 | " | 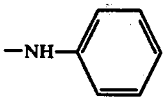 | " | " |
| 190 | 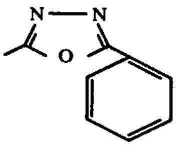 | 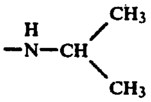 | " | " |

-continued

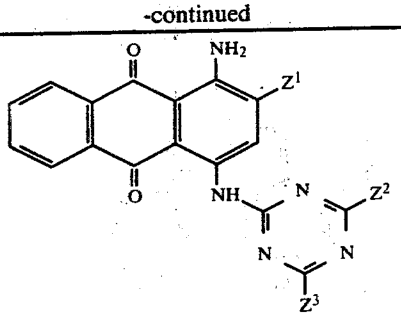

| Ex. | $Z^1$ | $Z^3$ | $Z^2$ | Hue |
|---|---|---|---|---|
| 191 | " | $-NH(CH_2)_3OCH_3$ | " | " |
| 192 | 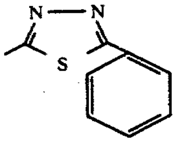 | 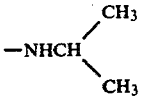 | " | " |
| 193 | 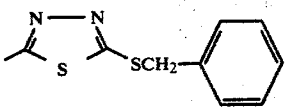 | " | " | " |
| 194 | 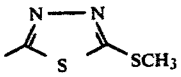 | " | " | " |
| 195 | 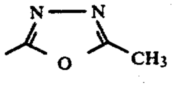 | " | 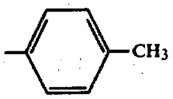 | " |
| 196 | 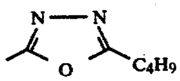 | " | " | " |
| 197 | " | " | 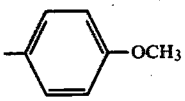 | " |

EXAMPLE 198

(a) Cotton cloth is padded on a padding machine with a liquor containing 20 parts of the dye of the formula:

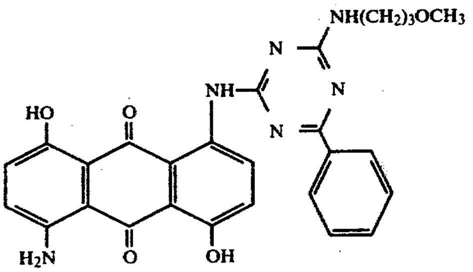

in the form of an aqueous formulation obtained according to (c) below, 300 parts of a 3% alginate thickening, 550 parts of water and 130 parts of polyethylene oxide having a molecular weight of 300. Liquor pickup is 80% based on the cloth. The cloth is dried at 100° C. To fix the dye it is treated for five minutes with superheated steam at 190° C. It is then rinsed cold, washed at 90° C. in a liquor containing 3 parts of the condensation product of a mixture of $C_{12}$ to $C_{15}$ alcohols with ethylene oxide to 997 parts of water.

When a polyester/cotton union fabric (weight ratio 67:33) is used instead of a cotton cloth, a blue dyeing in which the two fibers are dyed the same shade is obtained after fixing. Instead of fixing with superheated steam fixing may also be carried out with hot air in two minutes at 195° C.

(b) The dye used in Example 198(a) is prepared in the following manner: 27.9 parts of 4,8-diaminoanthrarufin, 23 parts of phenyldichlorotriazine and 200 parts of N-methylpyrrolidone are stirred for two hours at 80° C. 20 parts of γ-methoxypropylamine is then dripped in and the whole is stirred for another three hours at 80° C. The whole is then cooled, poured into water, filtered and the filter cake is dried. 30 parts of a blue powder is obtained.

(c) The powder obtained according to (b) is converted as described in Example 1(c) into an aqueous formulation.

By using an equal amount of a dye specified in the following Table instead of the dye specified in Example 198(a), a dyeing with similar fastness properties are obtained. The hues of the dyeings are given in the Table. The dyes may be prepared as described in Example 198(b) and converted into aqueous formulations according to Example 1(c).

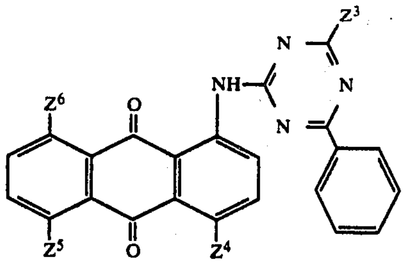
| Ex. | $Z^4$ | $Z^5$ | $Z^6$ | $Z^3$ | Hue |
|---|---|---|---|---|---|
| 199 | OH | $NH_2$ | OH | $-NHCCH_3$ | blue |
| 200 | " | " | " | 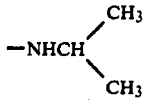 | " |
| 201 | " | " | " | $-NHC_4H_9$ | " |
| 202 | " | " | " | $-NHCH_2CH_2CH_2OC_3H_7$ | " |
| 203 | " | " | " | $-NHCH_2CH_2OCH_2CH_2OCH_3$ | " |
| 204 | " | " | " | 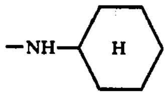 | " |
| 205 | " | " | " | 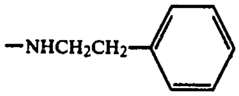 | " |
| 206 | " | " | " | 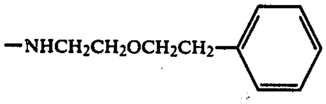 | " |
| 207 | " | " | " | 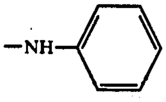 | " |
| 208 | " | " | " | 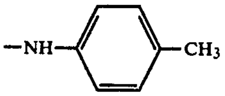 | " |
| 209 | " | " | " | 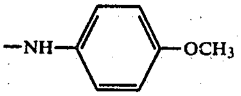 | " |
| 210 | " | OH | $NH_2$ | 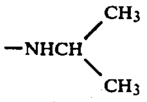 | " |
| 211 | " | " | " | $-NHCH_2CH_2CH_2CH_3$ | " |
| 212 | " | " | " | 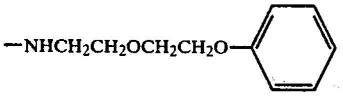 | " |
| 213 | " | " | " | 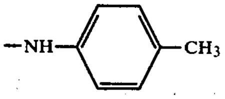 | " |
| 214 | " | " | " | 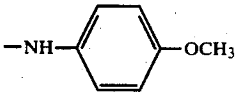 | " |
| 215 | " | " | " | 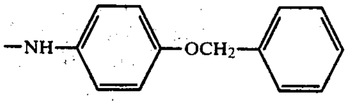 | " |

-continued
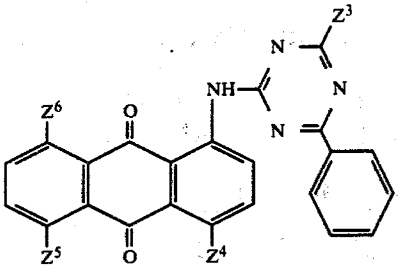
| Ex. | $Z^4$ | $Z^5$ | $Z^6$ | $Z^3$ | Hue |
|---|---|---|---|---|---|
| 216 | " | " | " | 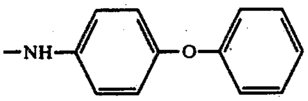 | " |
| 217 | $NH_2$ | " | OH | 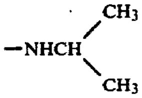 | " |
| 218 | " | " | " | $-NHCH_2CH_2CH_2OCH_3$ | " |
| 219 | " | " | " | 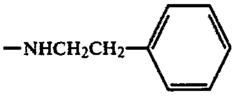 | " |
| 220 | " | $NH_2$ | " | 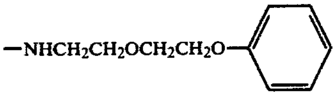 | " |
| 221 | " | " | " | 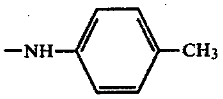 | " |
| 222 | " | " | " | 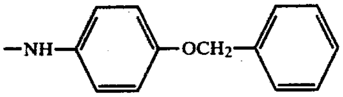 | " |
| 223 | " | " | " | 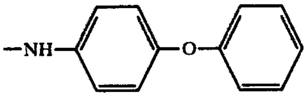 | " |
| 224 | " | " | $NH_2$ | 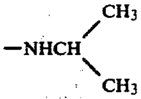 | " |
| 225 | " | " | " | $-NHCH_2CH_2CH_2OC_2H_5$ | " |
| 226 | " | " | " | 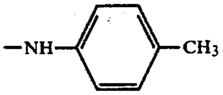 | " |
| 227 | " | " | " | 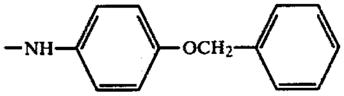 | " |
| 228 | OH | OH | $NO_2$ | 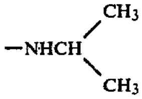 | " |
| 229 | " | " | " | 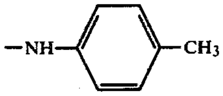 | " |
| 230 | " | " | " | 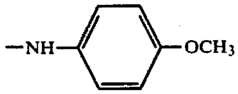 | " |

-continued
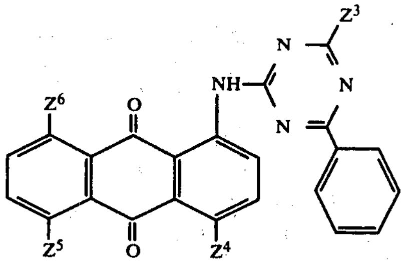
| Ex. | $Z^4$ | $Z^5$ | $Z^6$ | $Z^3$ | Hue |
|---|---|---|---|---|---|
| 231 | " | " | " | 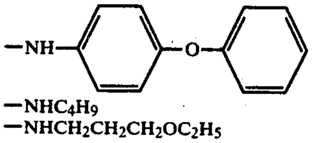 | " |
| 232 | " | $NO_2$ | OH | $-NHC_4H_9$ | " |
| 233 | " | " | " | $-NHCH_2CH_2CH_2OC_2H_5$ | " |
| 234 | " | " | " | 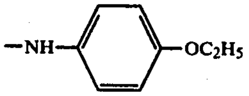 | " |
| 235 | " | " | " | 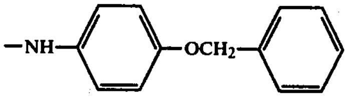 | " |
| 236 | " | " | " | 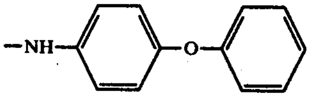 | " |
| 237 | $-NHCHCH_2CH_3$<br>\|<br>$CH_3$ | " | " | $CH_3$<br>/<br>$-NHCH$<br>\\<br>$CH_3$ | " |
| 238 | " | " | " | 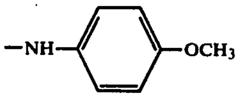 | " |
| 239 | " | " | " | 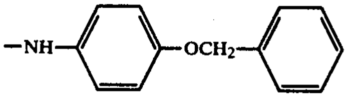 | " |
| 240 | OH | 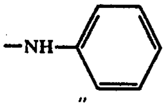 | " | $CH_3$<br>/<br>$-NHCH$<br>\\<br>$CH_3$ | " |
| 241 | " | " | " | $-NHC_4H_9$ | " |
| 242 | " | " | " | 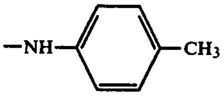 | " |
| 243 | " | " | " | 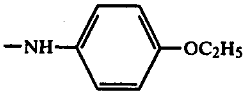 | " |
| 244 | " | OH | 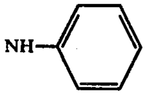 | $CH_3$<br>/<br>$-NHCH$<br>\\<br>$CH_3$ | " |
| 245 | " | " | " | 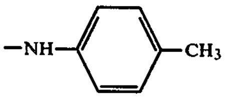 | " |
| 246 | $NH_2$ | " | H | $CH_3$<br>/<br>$-CH$<br>\\<br>$CH_3$ | violet |

-continued
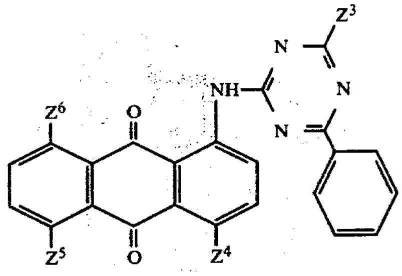
| Ex. | $Z^4$ | $Z^5$ | $Z^6$ | $Z^3$ | Hue |
|---|---|---|---|---|---|
| 247 | " | " | H | $—CH_2CH_2CH_2OC_2H_5$ | " |
| 248 | " | " | H | 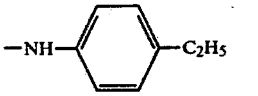 | " |
| 249 | " | " | H | 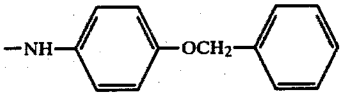 | " |
| 250 | " | $NH_2$ | H | 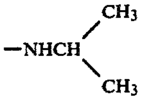 | blue |
| 251 | " | " | $NO_2$ | " | " |
| 252 | " | " | " | 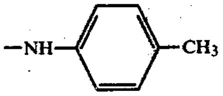 | " |
| 253 | H | OH | H | 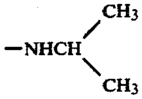 | yellow |
| 254 | H | $NH_2$ | H | " | orange |
| 255 | H | " | H | 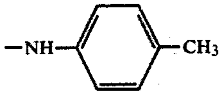 | " |
| 256 | H | " | H | 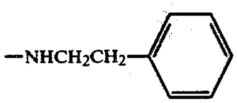 | " |
| 257 | H | 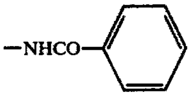 | H | 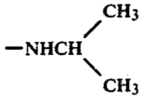 | yellow |
| 258 | H | " | H | $—NHCH_2CH_2CH_2OCH_3$ | " |
| 259 | H | $—NHCOCH_3$ | H | 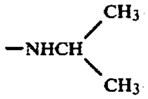 | " |
| 260 | H | H | $NH_2$ | " | orange |
| 261 | H | H | " | 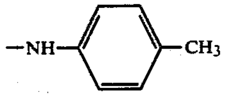 | " |
| 262 | H | 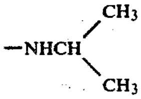 | H | 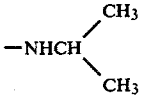 | " |
| 263 | —OH | H | H | 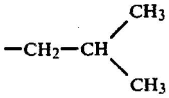 | yellow |

-continued
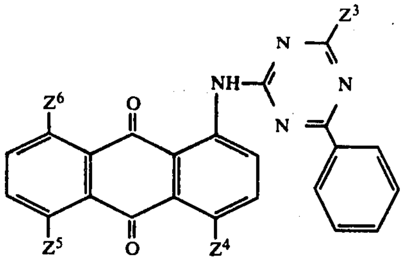
| Ex. | $Z^4$ | $Z^5$ | $Z^6$ | $Z^3$ | Hue |
|---|---|---|---|---|---|
| 264 | " | 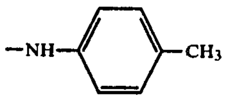 | $-OH$ | " | blue |
| 265 | " | " | " | $-C_4H_9(n)$ | " |
| 266 | " | $-OH$ | $-NH_2$ | $-C(CH_3)_3$ | " |
| 267 | " | " | " | $-C_5H_{11}(n)$ | " |
| 268 | " | " | " | $-C(CH_3)_2-C_2H_5$ | " |
| 269 | " | " | " | $-CH_2-CH(OH)-CH_3$ | " |
| 270 | " | " | " | $-C_6H_{13}(n)$ | " |
| 271 | " | " | " | $-CH_2-CH(C_2H_5)-C_4H_9(n)$ | " |
| 272 | " | " | " | 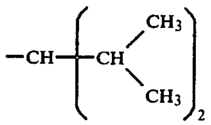 | " |
| 273 | " | " | " | $-(CH_2)_3-OCH_2-CH(C_2H_5)-C_4H_9(n)$ | " |
| 274 | " | " | " | $-(CH_2)_3-OCH_3$ | " |
| 275 | " | " | " | $-(CH_2)_3-OC_2H_5$ | " |
| 276 | " | " | " | $-(CH_2)_3-OC_3H_7(n)$ | " |
| 277 | " | " | " | $-(CH_2)_3-OC_4H_9(n)$ | " |
| 278 | " | " | " | $-(CH_2)_2-OC_3H_7(i)$ | " |
| 279 | " | " | " | 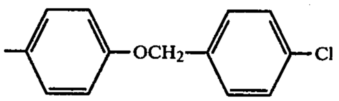 | " |
| 280 | " | " | " | 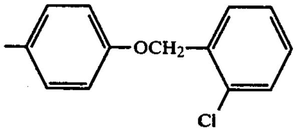 | " |
| 281 | " | " | $-OH$ | 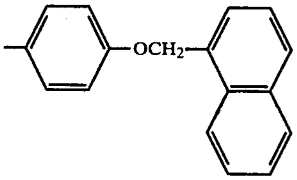 | " |
| 282 | " | " | " | 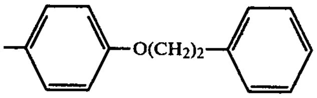 | " |
| 283 | " | $-NH_2$ | " | 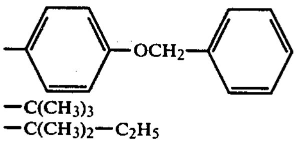 | " |
| 284 | " | " | " | $-C(CH_3)_3$ | " |
| 285 | " | " | " | $-C(CH_3)_2-C_2H_5$ | " |
| 286 | " | " | " | $-CH_2-CH(OH)-CH_3$ | " |

-continued

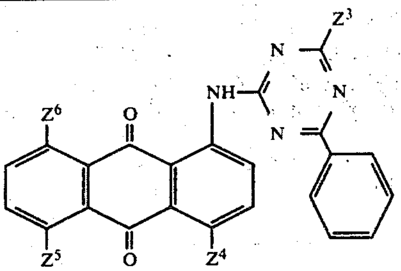

| Ex. | $Z^4$ | $Z^5$ | $Z^6$ | $Z^3$ | Hue |
|---|---|---|---|---|---|
| 287 | " | " | " | $-C_6H_{13}(n)$ | " |
| 288 | " | " | " | 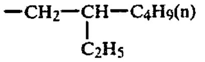 | " |
| 289 | " | " | " | 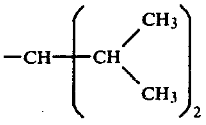 | " |
| 290 | " | " | " | 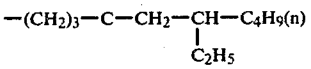 | " |
| 291 | " | " | " | 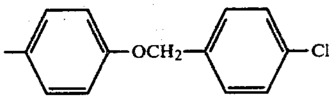 | " |
| 292 | " | " | " | 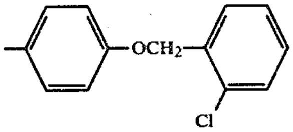 | " |
| 293 | " | " | " | 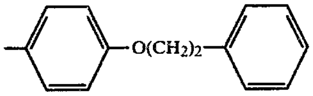 | " |

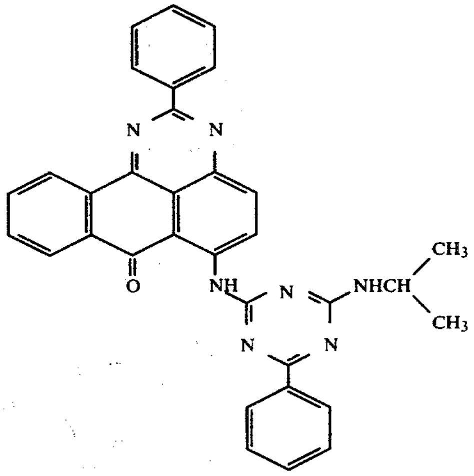

EXAMPLE 294

(a) Cotton cloth is padded on a padding machine with a liquor consisting of 150 parts of polyethylene oxide in 850 parts of water so that the liquor pickup is 80% and the padded cloth is dried at 100° C. The cloth pretreated in this way is printed with a rotary screen printing machine with a dye formulation which consists of 30 parts of the dye of the formula:

in the form of the aqueous formulation obtained according to (c) and 970 parts of a 10% alginate thickening. After drying the print at 105° C. it is treated for seven minutes at 185° C. with superheated steam at 185° C. and finished off by rinsing and soaping as described in Example 1. A fast yellow print is obtained on a white ground.

(b) The dye is prepared as described in Example 111(b), an equimolar amount of C-phenyl-4-amino-(1,9)-anthrapyrimidine being used instead of 1-amino-4-hydroxyanthraquinone.

(c) The dye obtained is converted into an aqueous formulation as described in Example 1(c).

When the dye specified in Example 294 is replaced by one of the dyes specified in the following Table dyeings are obtained with similar fastness properties in the hues stated. The dyes are prepared analogously to the statements in Example 111(b) and converted into aqueous formulations according to Example 294(c).

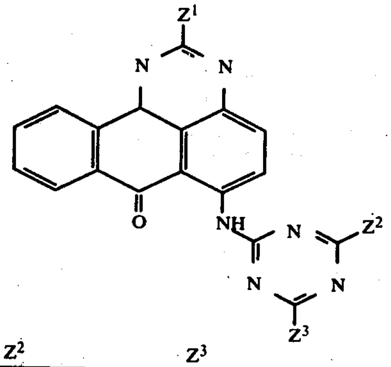

| Ex. | $Z^1$ | $Z^2$ | $Z^3$ | Hue |
|---|---|---|---|---|
| 295 | 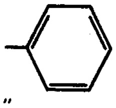 | 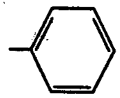 | $-NHCH_2CH_2CH_2OC_2H_5$ | yellow |
| 296 | " | " | 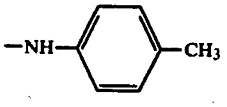 | " |
| 297 | " | " | 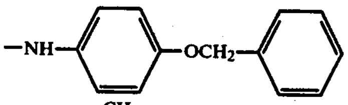 | " |
| 298 | " | 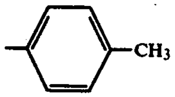 | 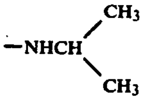 | " |
| 299 | H | 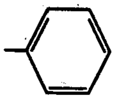 | " | " |
| 300 | H | " | $-NHC_4H_9$ | " |
| 301 | H | " | 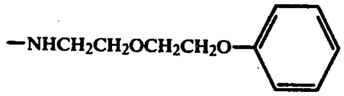 | " |
| 302 | H | " | 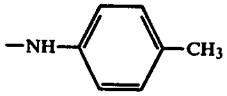 | " |
| 303 | $CH_3$ | " | 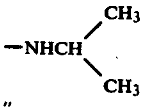 | " |
| 304 | 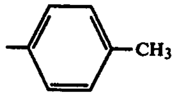 | " | " | " |
| 305 | 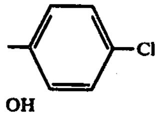 | " | " | " |
| 306 | OH | " | " | " |
| 307 | " | " | 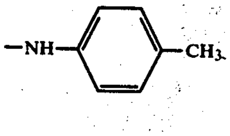 | " |

-continued

| | | | | |
|---|---|---|---|---|
| 308 | " | " | 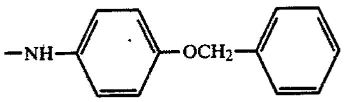 | " |
| 309 | " | 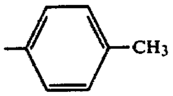 | 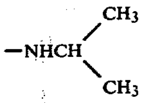 | " |

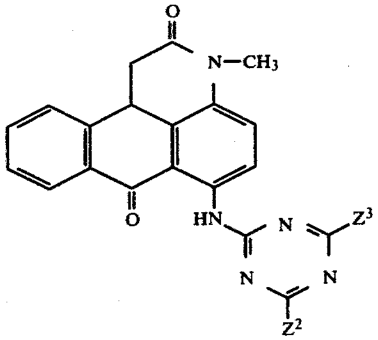

| Ex. | $Z^2$ | $Z^3$ | Hue |
|---|---|---|---|
| 310 | 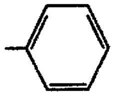 | 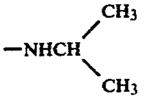 | red |
| 311 | " | $-NHCH_2CH_2OCH_3$ | " |
| 312 | " | 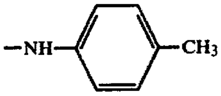 | " |
| 313 | " | 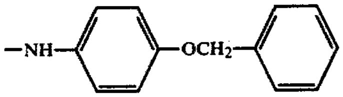 | " |
| 314 | 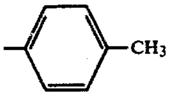 | 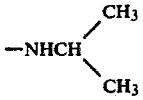 | " |

EXAMPLE 315

(a) Cotton cloth is printed by rotary screen printing with a dye formulation which contains 10 parts of the dye of the formula:

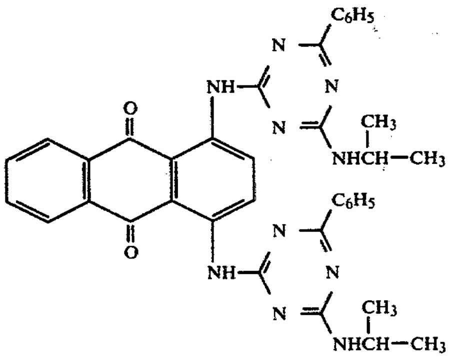

in the form of an aqueous formulation obtained according to (c), 100 parts of polyethylene oxide of molecular weight 300 and 790 parts of a 3% alginate thickening and the print is dried at 100° C. It is then treated for one minute at 200° C. with hot air. The print is rinsed cold, soaped at the boil, again rinsed cold and dried. A blue print on a white ground is obtained; it is fast to light and washing.

(b) The dye is prepared analogously to Example 1(a) by reaction of 1 mole of 1,4-diaminoanthraquinone with 2 moles of the appropriate triazine derivative.

(c) The dye is converted into an aqueous formulation as described in Example 1(c).

When one of the dyes specified in the following Table is used instead of the dye specified in Example 315, dyeings are obtained having similar fastness properties and the hues given in the Table.

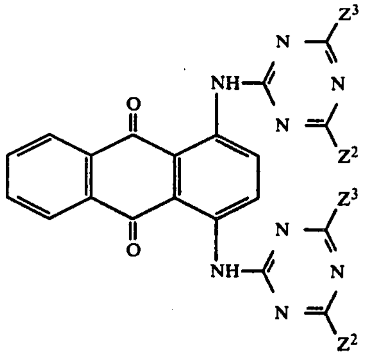
| Example | Z² | Z³ | Hue |
|---|---|---|---|
| 316 | 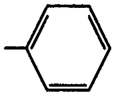 | $-NHC_4H_9$ | orange |
| 317 | " | $-NHCH_2CH_2CH_2OCH_3$ | orange |
| 318 | " | 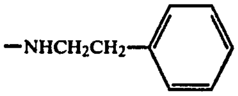 | orange |
| 319 | " | 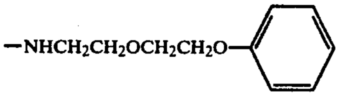 | orange |
| 320 | " | 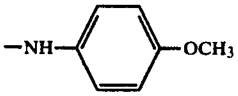 | orange |
| 321 | 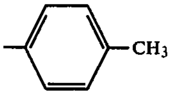 | 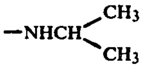 | orange |
| 322 | " | 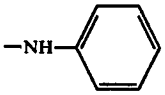 | orange |
| 323 | 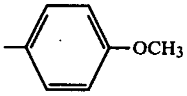 | 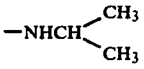 | orange |
| 324 | " | 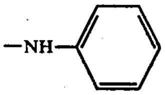 | orange |
| 325 | " | 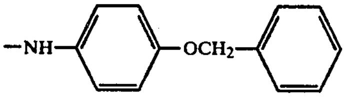 | orange |
EXAMPLE 326
(a) Cotton cloth is printed by rotary screen printing with a dye formulation containing 10 parts of the dye of the formula:

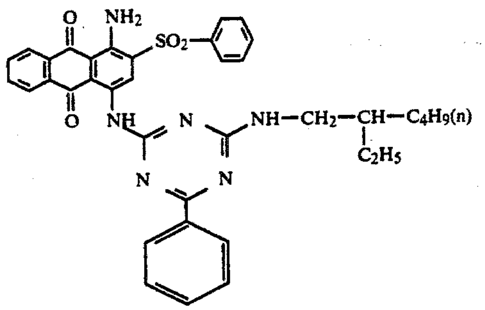

in the form of a 30% aqueous formulation (see (c)) and 100 parts of polyethylene oxide (molecular weight 300) in 790 parts of a 3% alginate thickening and the print is dried at 100° C. The printed cloth is then heated for one minute with hot air to 200° C., rinsed cold, soaped at the boil, again rinsed cold and dried.

A blue print on a white ground is obtained.

(b) The dye used is prepared from 1,4-diamino-2-phenylsulfonylanthraquinone by reaction with 2-(2'-ethylenehexylamino)-4-phenyl-6-chlorotriazine as described in Example 1(b).

(c) The dye obtained according to (b) is converted as described in Example 1(c) into a 30% aqueous formulation. A liquid formulation is obtained which is stable in storage.

When the dye of Example 326(a) is replaced by the same amount of one of the dyes specified in the following Table dyeings having similar to equal fastness properties are obtained. The hues of the dyeings are given in the right-hand column. Mixtures of two or more than two of the said dyes may also be used.

The dyes are prepared as described in Example 1(b) or 326(b) and converted into liquid formulations as described in Example 1(c).

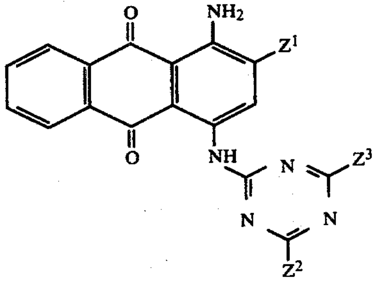

| Ex. | $Z^1$ | $Z^2$ | $Z^3$ | Hue |
|---|---|---|---|---|
| 327 | 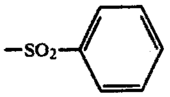 | 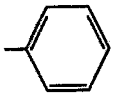 | $-NH-(CH_3)_2-O-CH_3$ | blue |
| 328 | " | " | $-NH-C_5H_{11}(n)$ | " |
| 329 | " | " | $-NH-C_4H_9(n)$ | " |
| 330 | " | " | 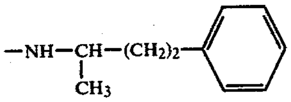 | " |
| 331 | " | " | 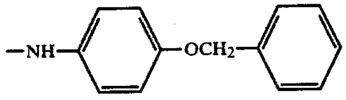 | " |
| 332 | " | " | 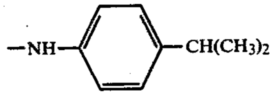 | " |
| 333 | | " | $-NH-C_3H_7(n)$ | " |
| 334 | " | " | 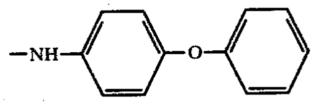 | " |
| 335 | " | " | $-NH-C_2H_5$ | " |
| 336 | " | " | 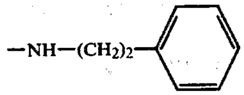 | " |
| 337 | " | " | 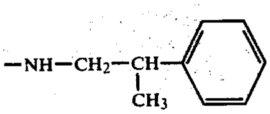 | " |

-continued
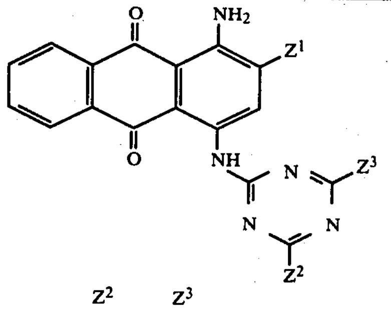
| Ex. | $Z^1$ | $Z^2$ | $Z^3$ | Hue |
|---|---|---|---|---|
| 338 | " | " | 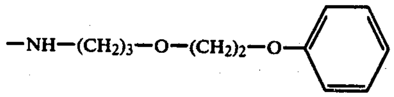 | " |
| 339 | " | " | 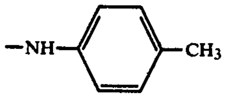 | " |
| 340 | " | " | 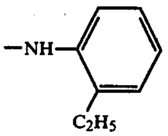 | " |
| 341 | 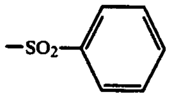 | 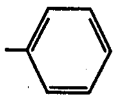 | 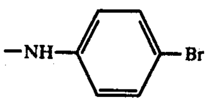 | " |
| 342 | " | " | 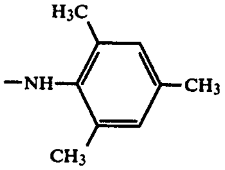 | " |
| 343 | 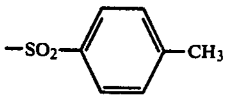 | 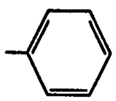 | 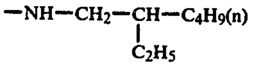 | " |
| 344 | " | " | $-NH-(CH_2)_3-OC_2H_5$ | " |
| 345 | " | " | 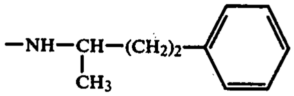 | " |
| 346 | " | " | 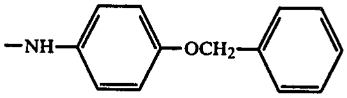 | " |
| 347 | " | " | 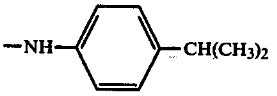 | " |
| 348 | " | " | 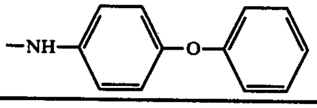 | " |
EXAMPLE 349
(a) Union fabric of polyester and cotton in the ratio by weight 67:33 is printed with a paste consisting of 10 parts of the dye of the formula:

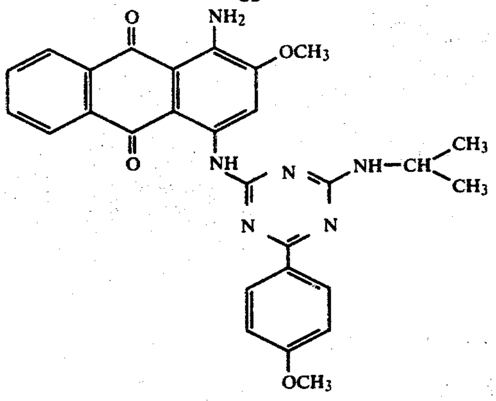

in the form of an aqueous formulation prepared according to (c) below, 110 parts of the reaction product of polyethylene oxide of the molecular weight 300 with boric acid in the molar ratio 3:1 and 790 parts of a 10% alginate thickening. The print is dried at 105° C. and treated for six minutes at 180° C. with superheated steam. It is then rinsed with cold water, soaped at 80° C., rinsed again cold and dried.

A blue print fast to light and washing is obtained on a white ground.

(b) The compound specified in Example 349(a) is obtained by the reaction of 1,4-diamino-2-methoxyanthraquinone with 2-isopropylamino-4-(4'-methoxyphenyl)-6-chloro-1,3,5-triazine in o-dichlorobenzene for three hours at 180° C. After the reaction mixture has cooled it is diluted with cyclohexane, and the dye is suction filtered, washed with methanol and dried. A blue powder is obtained.

(c) The powder is converted as described in Example 1(c) into an aqueous formulation.

When the said dye in the paste is replaced by the same amount of one of the dyes set out in the following Table dyeings are obtained having similar fastness properties and the hues given in the Table.

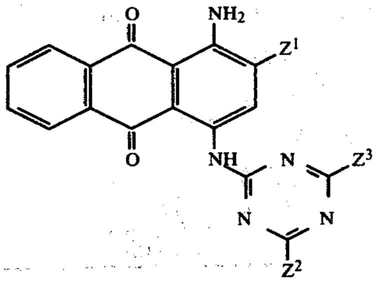

| Ex. | $Z^1$ | $Z^2$ | $Z^3$ | Hue |
|---|---|---|---|---|
| 350 | $-OCH_3$ |  | 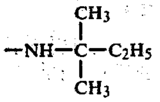 | blue |
| 351 | " | " | $-NH-C_6H_{13}(n)$ | " |
| 352 | " | " | $-NH-CH(-CH(CH_3)_2)_2$ | " |
| 353 | " | " | 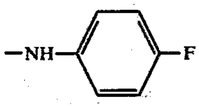 | " |
| 354 | " | " | 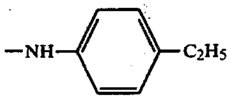 | " |
| 355 | " | " | 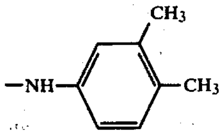 | " |
| 356 | " | " | 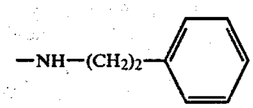 | " |
| 357 | " | " | 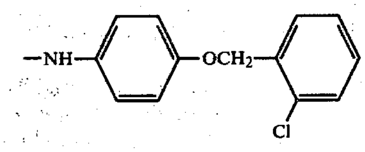 | " |
| 358 | " | " | 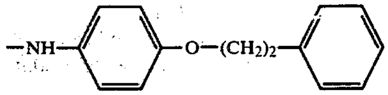 | " |

-continued

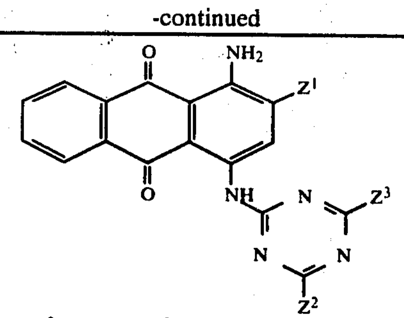

| Ex. | $Z^1$ | $Z^2$ | $Z^3$ | Hue |
|---|---|---|---|---|
| 359 | " | " | 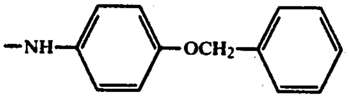 | " |
| 360 | " | " | $-NH-(CH_2)_3-O-CH_2-CH-C_4H_9(n)$<br>$\vert$<br>$C_2H_5$ | " |
| 361 | " | " | $-NH-CH_2-CH-C_4H_9(n)$<br>$\vert$<br>$C_2H_5$ | " |
| 362 | " | 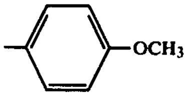 | $-NH-(CH_2)_3-OC_2H_5$ | " |
| 363 | " | 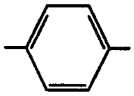 | $-NH-C_5H_{11}(n)$ | " |
| 364 | " | " | $-NH-C_2H_5$ | " |
| 365 | " | " | $-NH-C_4H_9(n)$ | " |

EXAMPLE 366

(a) Cotton cloth is printed by roller printing with a print paste consisting of 15 parts of the dye of the formula:

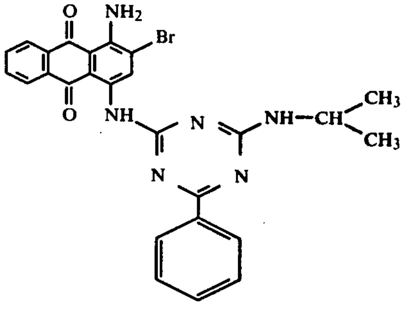

in the form of a 30% aqueous formulation, 110 parts of polyethylene oxide of the molecular weight 350, 30 parts of the diethanolamide of oleic acid and 845 parts of a 10% alginate thickening. The print is dried at 100° C. and then fixed by a treatment with hot air at 195° C. for one minute. The print is finished off as described in Example 1. A fast blue print is obtained on a white ground.

(b) The dye specified in Example 366(a) is prepared by the reaction of 1,4-diamino-2-bromoanthraquinone with 2-isopropylamino-4-phenyl-6-chloro-1,3,5-triazine analogously to Example 111(b).

(c) The dye obtained is converted as described in Example 1(c) into an aqueous formulation. A very finely particled formulation is obtained which is stable in storage.

When the dye specified in Example 366(a) is replaced by one or more of the dyes specified in the following Table dyeings having equal to similar fastness properties are obtained.

The dyes are prepared as described in Example 366(a) and converted into aqueous formulations as described in Example 1(c).

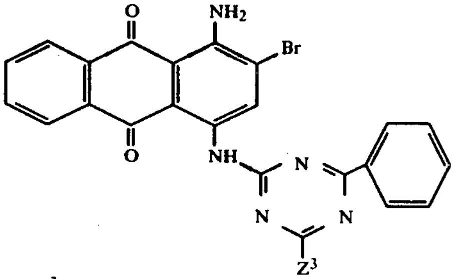

| Example | $Z^3$ | Hue |
|---|---|---|
| 367 | $-NH-C_2H_5$ | blue |
| 368 | $-NH-C_4H_9(n)$ | " |
| 369 | $-NH-C_5H_{11}(n)$ | " |
| 370 | $-NH-C(CH_3)_3$ | " |
| 371 | $CH_3$<br>$\vert$<br>$-NH-C-C_2H_5$<br>$\vert$<br>$CH_3$ | " |
| 372 | $-NH-CH_2-CH-C_4H_9(n)$<br>$\vert$<br>$C_2H_5$ | " |

-continued

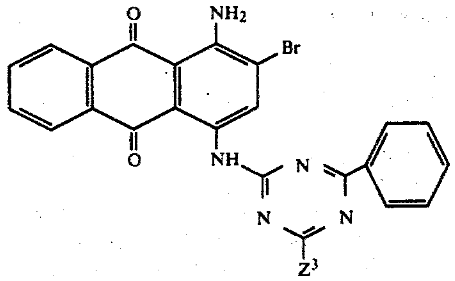

| Example | $Z^3$ | Hue |
|---|---|---|
| 373 | 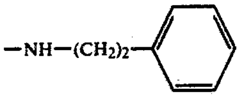 | " |
| 374 | 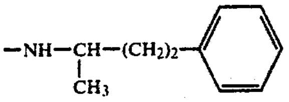 | " |
| 375 | 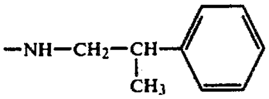 | " |
| 376 | 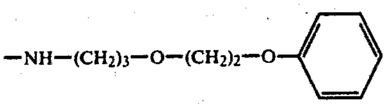 | " |
| 377 | $-NH-(CH_2)_2-OCH_3$ | " |
| 378 | $-NH-(CH_2)_3-OC_2H_5$ | " |
| 379 | 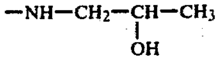 | " |
| 380 | 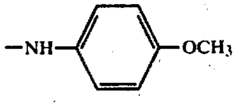 | " |
| 381 | 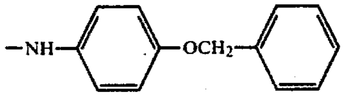 | " |
| 382 | 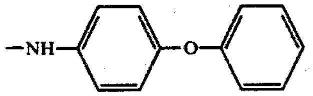 | " |
| 383 | 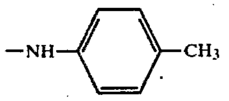 | " |
| 384 | 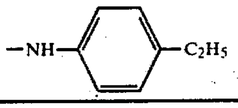 | " |

We claim:

1. Dyed, water-swellable cellulosic fibers having a dyeing which is fast to washing, dry-cleaning and light, said fibers having been dyed by applying thereto simultaneously or successively water; one of ethylene glycol, propylene glycol, diethylene glycol, and dipropylene glycol serving as a water retention agent; polyethylene oxide or a reaction product of polyethylene oxide with boric acid in a molar ratio of 3:1; and an essentially water insoluble dye of the formula

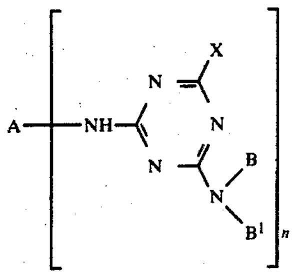

in which

A is unsubstituted or substituted anthraquinonyl, anthrapyridone or anthrapyrimidine group of the formulae

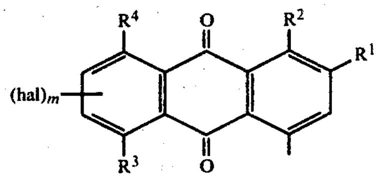
,

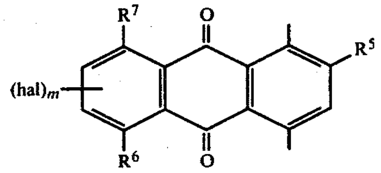
,

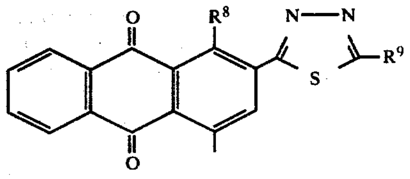
,

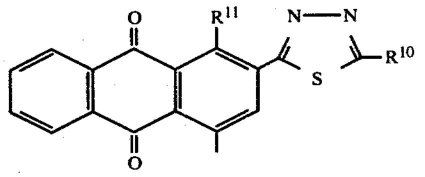
,

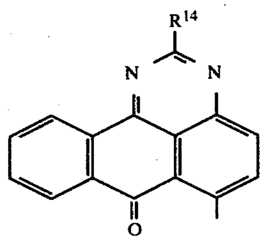
or

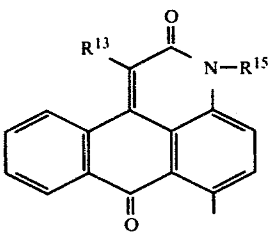

in which hal is chloro or bromo;

m is zero, 1 or 2;

$R^1$ is hydrogen, chloro, bromo, methyl, ethyl, $C_1$ to $C_6$ alkoxy, phenoxy, alkylphenoxy of one to six carbon atoms in the alkyl, chlorophenoxy, bromophenoxy, $C_1$ to $C_6$ alkylthio, phenylthio, alkylphenylthio of one to six carbon atoms in the alkyl, acetyl, propionyl, benzoyl, monomethylbenzoyl, dimethylbenzoyl, trimethylbenzoyl, phenoxybenzoyl, $C_1$ to $C_6$ alkoxycarbonyl, N-alkylaminocarbonyl or N,N-dialkylaminocarbonyl of one to six carbon atoms per and/or N-alkylsulfamoyl of one to four carbon atoms per alkyl; $C_1$ to $C_5$ alkylthio; $C_7$ to $C_{10}$ phenylalkylthio; phenylthio; phenylthio substituted by chloro, bromo, $C_1$ to $C_4$ alkyl, methoxy or ethoxy;

$R^{10}$ is phenyl; $C_1$ to $C_5$ alkyl; $C_1$ to $C_8$ alkylthio; $C_3$ to $C_8$ alkoxyalkyl; $C_1$ to $C_5$ alkylamino; methoxy; ethoxy; phenalkylthio of one to five carbon atoms in the alkyl;

$R^{11}$ is amino or $C_1$ to $C_5$ alkylamino;

$R^{13}$ is hydrogen; $C_1$ to $C_6$ alkoxycarbonyl; $C_1$ to $C_4$ alkylcarbonyl; benzoyl or cyano;

$R^{15}$ is hydrogen; $C_1$ to $C_5$ alkyl; or phenyl;

$R^{14}$ is hydrogen; $C_1$ to $C_5$ alkyl; phenyl; or $C_1$ to $C_5$ alkylphenyl;

X is 4-chlorophenyl, 4-bromophenyl, 4-methoxyphenyl, 3,N,N-diethylsulfamoylphenyl, 4-methylphenyl, 4-isopropylphenyl or phenyl;

B is hydrogen;

$B^1$ is $C_1$ to $C_8$ alkyl, 2-hydroxyethyl, alkoxyalkyl of a total of three to seven carbon atoms, phenalkyl of a total of seven to ten carbon atoms, phenoxyalkyl of two to four carbon atoms in the alkyl, phenoxyalkoxyalkyl of four to six carbon atoms in the alkoxyalkyl, cyclohexyl, phenyl or phenyl in which one hydrogen atom is replaced by fluoro, trifluoromethyl, phenalkoxy of seven to eight carbon atoms, carbonylalkoxy of a total of two to five carbon atoms, alkylaminocarbonyl or dialkylsulfamoyl of one to four carbon atoms per alkyl or phenoxy and one to three hydrogen atoms are optionally replaced by methyl, methoxy, ethoxy, chloro or bromo and the substituents may be identical or different; and n is one of the integers 1 and 2.

2. Dyed fibers as claimed in claim 1 wherein $R^1$ is hydrogen, bromo, chloro, acetyl, carbonylalkoxy of one to five carbon atoms in the alkyl, benzoyl, monomethylbenzoyl, dimethylbenzoyl, trimethylbenzoyl, methoxybenzoyl, ethoxybenzoyl, phenoxybenzoyl, N-alkylaminocarbonyl of one to four carbon atoms in the alkyl, nitro, cyano, $C_1$ to $C_4$ alkylsulfonyl, phenylsulfonyl, methylphenylsulfonyl or $C_1$ to $C_4$ alkoxy;

$R^2$ is hydrogen, hydroxy, amino, $C_1$ to $C_4$ alkylamino; phenylamino, phenylamino substituted by $C_1$ to $C_5$ alkyl, methoxy, ethoxy or $C_2$ to $C_4$ C-acyloxy; or $C_1$ to $C_4$ alkoxy;

$R^3$ and $R^4$ are hydrogen, hydroxy, amino and may be identical or different;

$R^5$, $R^6$, $R^7$, $R^{13}$ and $R^{15}$ are all hydrogen;

$R^8$ and $R^{11}$ are both amino;

$R^9$ is phenoxyalkyl or phenalkyl of one to six carbon atoms in the alkyl, or $C_1$ to $C_5$ alkyl;

$R^{10}$ is $C_1$ to $C_5$ alkyl, $C_1$ to $C_8$ alkylthio or phenalkylthio of two to four carbon atoms in the alkyl;

$R^{14}$ is hydrogen, hydroxy, phenyl, $C_1$ to $C_3$ alkylphenyl or chlorophenyl; and $R^{15}$ is hydrogen and X, B, $B^1$ and n have the meanings given in claim 1.

3. Dyed, water-swellable cellulosic fibers having a dyeing which is fast to washing, dry-cleaning and light, said fibers having been dyed by applying simultaneously or successively thereto water; one of ethylene glycol, propylene glycol, diethylene glycol, and dipropylene glycol serving as a water retention agent; polyethylene oxide or a reaction product of polyethylene oxide with boric acid in a molar ratio fo 3:1; and an essentially water insoluble dye of the formula

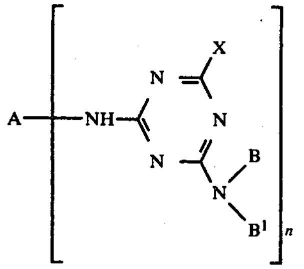

in which A in the formula is a radical of the formula:

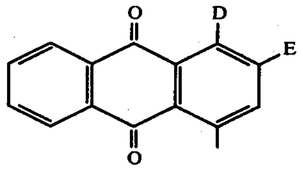
,
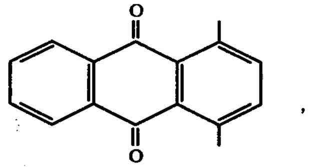
,
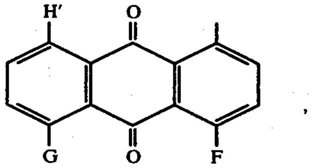
,
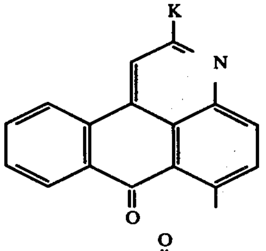

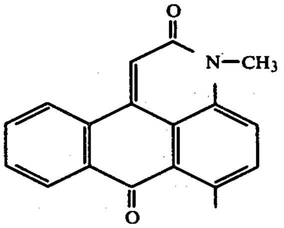

in which

D is hydroxy, amino, $C_1$ to $C_4$-alkylamino, phenylamino, phenylamino substituted by methyl, methoxy, chloro or bromo in the 4-position, alkylcarbonylamino of one to three carbon atoms in the alkyl or benzylamino;

E is bromo, acetyl, methoxycarbonyl, ethoxycarbonyl, propoxycarbonyl, butoxycarbonyl, benzoyl, 4-methylbenzoyl, 2,4,6-trimethylbenzoyl, 4-methoxybenzoyl, 4-phenoxybenzoyl, N-propylaminocarbonyl, nitro, cyano, methylsulfonyl, phenylsulfonyl, 4-methylsulfonyl, methoxy, or 2-oxadiazolyl or 2-thiodiazolyl which bear phenoxyalkyl or phenalkyl of one to six carbon atoms in the alkyl, $C_1$ to $C_5$ alkyl, $C_1$ to $C_8$ alkylthio or phenalkylthio of two to four carbon atoms in the alkyl as substituents in the 5-position;

F is hydrogen, hydroxy, amino or $C_1$ to $C_5$ alkylamino;

G is hydroxy, amino, phenylamino, benzoylamino or alkylcarbonylamino of one to three carbon atoms in the alkyl;

H' is hydrogen, hydroxy or phenylamino and one of the substituents G and H' may be nitro;

K is hydrogen, hydroxy, methyl, phenyl, 4-methylphenyl or 4-chlorophenyl;

X is 4-chlorophenyl, 4-bromophenyl, 4-methoxyphenyl, 3-N,N-diethylsulfamoylphenyl, 4-methylphenyl, methyl, ethyl, 4-isopropylphenyl or phenyl;

B is hydrogen;

$B^1$ is $C_1$ to $C_8$ alkyl, 2-hydroxyethyl, alkoxyalkyl of a total of three to seven carbon atoms, phenalkyl of a total of seven to ten carbon atoms, phenoxyalkyl of two to four carbon atoms in the alkyl, phenoxyalkoxyalkyl of four to six carbon atoms in the alkoxyalkyl, cyclohexyl, phenyl or phenyl in which one hydrogen atom is substituted by fluoro, trifluoromethyl, phenalkoxy of seven to eight carbon atoms, carbonylalkoxy of a total of two to five carbon atoms, alkylaminocarbonyl or dialkylsulfamoyl of one to four carbon atoms per alkyl or phenoxy and one to three hydrogen atoms may optionally be replaced by methyl, methoxy, ethoxy, chloro or bromo and the substituents may be identical or different; and n is 1 or 2.

4. Dyed fibers as claimed in claim 3 in which A in the formula is a radical of the formula:

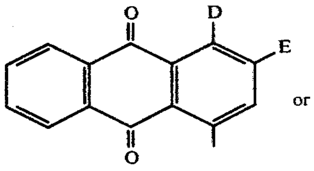

or

-continued

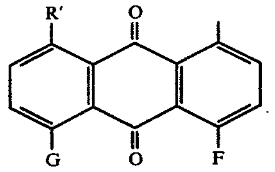

in which

D is amino;

E is acetyl, benzoyl, methoxy, bromo, phenylsulfonyl or p-methylsulfonyl;

F, G and H' each are hydroxy or amino, one or two of them being hydroxy;

X is 4-chlorophenyl, 4-methoxyphenyl, 4-methylphenyl or phenyl;

B is hydrogen; and $B^1$ is $C_3$ to $C_8$ alkyl, phenalkyl of a total of eight to ten carbon atoms, alkoxyalkyl of a total of five to eight carbon atoms or phenyl in which one or two hydrogen atoms are optionally replaced by $C_1$ to $C_4$ alkyl, phenoxy, chloro or trifluoromethyl and the substituents may be identical or different.

5. Dyed fibers as claimed in claim 3 in which X is phenyl.

6. Dyed fibers as claimed in claim 3 in which A in the formula is a radical of the formula:

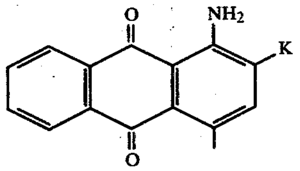

X is phenyl;

B is hydrogen;

K is acetyl; and

B' is isopropyl, n-butyl, 2,4-dimethylpentyl-(2), 2-ethylhexyl, $\beta$-phenylethyl or 2-chloro-5-trifluoromethylphenyl; or K is methoxy; and $B^1$ is isopropyl, 2-methylbutyl-(2), n-hexyl or 2,4-dimethylpentyl-(3); or K is bromo; and $B^1$ is isopropyl; or K is phenylsulfonyl or 4-methylphenylsulfonyl; and $B^1$ is isopropyl, 2-ethylhexyl, 3-ethoxypropyl, n-pentyl, n-butyl, 4-phenylbutyl-(2), 4-benzyloxyphenyl, 4-isopropylphenyl or 4-phenoxyphenyl.

7. Dyed fibers as claimed in claim 3 in which A in the formula is a radical of the formula:

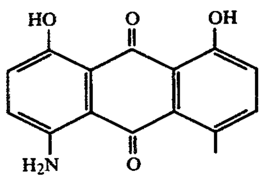

X is phenyl;

B is hydrogen; and $B^1$ is 4-benzyloxyphenyl.

* * * * *